US012128787B2

(12) United States Patent
Ikui et al.

(10) Patent No.: US 12,128,787 B2
(45) Date of Patent: Oct. 29, 2024

(54) BATTERY USE SYSTEM, CHARGING DEVICE, INFORMATION PROCESSING DEVICE, BATTERY USE METHOD, PROGRAM, AND STORAGE MEDIUM

(71) Applicant: HONDA MOTOR CO., LTD., Tokyo (JP)

(72) Inventors: Kuniaki Ikui, Wako (JP); Tatsuo Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/221,514

(22) Filed: Jul. 13, 2023

(65) Prior Publication Data

US 2023/0365022 A1 Nov. 16, 2023

Related U.S. Application Data

(63) Continuation of application No. 17/296,566, filed as application No. PCT/JP2019/046821 on Nov. 29, 2019, now abandoned.

(30) Foreign Application Priority Data

Nov. 29, 2018 (JP) .................................. 2018-223833
Nov. 29, 2018 (JP) .................................. 2018-223834

(51) Int. Cl.
*B60L 53/68* (2019.01)
*B60L 53/60* (2019.01)
(Continued)

(52) U.S. Cl.
CPC ............... *B60L 53/68* (2019.02); *B60L 53/80* (2019.02); *H01M 10/48* (2013.01);
(Continued)

(58) Field of Classification Search
CPC ...... H02J 7/00036; H02J 7/0013; H02J 7/005; H02J 7/00714; B60L 53/68; B60L 53/80
(Continued)

(56) References Cited

U.S. PATENT DOCUMENTS 5,349,535 A 9/1994 Gupta
5,631,536 A 5/1997 Tseng
(Continued)

FOREIGN PATENT DOCUMENTS

CN 1211844 3/1999
CN 101202777 6/2008
(Continued)

OTHER PUBLICATIONS

Chinese Office Action for Chinese patent Application No. 201980078213.7 mailed Dec. 1, 2023.
(Continued)

*Primary Examiner* — John T Trischler
(74) *Attorney, Agent, or Firm* — Amin, Turocy & Watson, LLP

(57) ABSTRACT

A battery use system includes a battery removably mounted on an electric power device, a charging device configured to charge the battery, and a server configured to communicate with the charging device. The charging device is configured to transmit the identification information of the battery accommodated in the accommodation unit to the server via a first communicator and control charging of the battery and/or detachment of the battery on the basis of reception information received by the first communicator from the server. The server is configured to determine whether or not the charging of the battery and/or the detachment of the battery accommodated in the accommodation unit are available on the basis of the identification information received by a second communicator from the charging device and
(Continued)

provision information provided from an information provider and transmit transmission information on an availability determination result to the charging device via the second communicator.

32 Claims, 14 Drawing Sheets

(51) Int. Cl.
    B60L 53/80      (2019.01)
    H01M 10/48     (2006.01)
    H02J 7/00       (2006.01)
    B60L 53/66      (2019.01)
    G06Q 30/0645   (2023.01)
    H01M 10/42     (2006.01)
    H01M 10/46     (2006.01)
    H01M 50/584    (2021.01)

(52) U.S. Cl.
    CPC ........ *H02J 7/00036* (2020.01); *H02J 7/0013* (2013.01); *H02J 7/005* (2020.01); *H02J 7/00714* (2020.01); *B60L 53/60* (2019.02); *B60L 53/665* (2019.02); *B60L 2200/12* (2013.01); *G06Q 30/0645* (2013.01); *H01M 2010/4278* (2013.01); *H01M 10/46* (2013.01); *H01M 50/584* (2021.01); *Y02T 10/7072* (2013.01); *Y02T 90/12* (2013.01); *Y02T 90/167* (2013.01); *Y04S 30/14* (2013.01)

(58) Field of Classification Search
    USPC ........................................................ 320/106
    See application file for complete search history.

(56) References Cited

U.S. PATENT DOCUMENTS

| | | |
|---|---|---|
| 5,831,350 A | 11/1998 | McConkey et al. |
| 6,154,006 A | 11/2000 | Hatanaka et al. |
| 6,184,655 B1 * | 2/2001 | Malackowski ....... H02J 7/0013 320/116 |
| 6,522,101 B2 * | 2/2003 | Malackowski ....... H02J 7/0013 320/116 |
| 6,921,939 B2 * | 7/2005 | Zeng ................... H01L 29/1095 257/305 |
| 7,723,951 B2 * | 5/2010 | Poisner ................. H02J 7/0045 320/112 |
| 7,948,207 B2 | 5/2011 | Scheucher |
| 7,993,155 B2 | 8/2011 | Heichal et al. |
| 8,006,793 B2 | 8/2011 | Heichal et al. |
| 8,013,571 B2 | 9/2011 | Agassi et al. |
| 8,022,666 B2 | 9/2011 | Li |
| 8,026,698 B2 | 9/2011 | Scheucher |
| 8,098,046 B2 * | 1/2012 | Poisner ................. H02J 7/0045 320/112 |
| 8,100,210 B2 | 1/2012 | Takeuchi et al. |
| 8,164,300 B2 | 4/2012 | Agassi et al. |
| 8,454,377 B2 | 6/2013 | Heichal et al. |
| 8,516,687 B2 | 8/2013 | Hozumi et al. |
| 8,517,132 B2 | 8/2013 | Heichal et al. |
| 8,560,147 B2 | 10/2013 | Taylor et al. |
| 8,710,795 B2 | 4/2014 | Scheucher |
| 8,729,865 B2 | 5/2014 | Scheucher |
| 8,796,987 B2 | 8/2014 | Scheucher |
| 8,860,377 B2 | 10/2014 | Scheucher |
| 8,862,304 B2 | 10/2014 | Chen et al. |
| 8,963,481 B2 | 2/2015 | Prosser et al. |
| 8,996,212 B2 | 3/2015 | Chen et al. |
| 9,007,020 B2 | 4/2015 | Prosser et al. |
| 9,070,923 B2 | 6/2015 | Yu et al. |
| 9,103,686 B2 | 8/2015 | Pettersson |
| 9,124,085 B2 | 9/2015 | Wu et al. |
| 9,176,680 B2 | 11/2015 | Chen et al. |
| 9,275,505 B2 | 3/2016 | Taylor et al. |
| 9,280,654 B1 * | 3/2016 | Peterson ............. H02J 7/00712 |
| 9,348,381 B2 | 5/2016 | Khoo et al. |
| 9,352,905 B2 * | 5/2016 | Fly ........................ B65G 1/02 |
| 9,381,822 B2 | 7/2016 | Scheucher |
| 9,390,566 B2 | 7/2016 | Taylor et al. |
| 9,424,697 B2 | 8/2016 | Wu et al. |
| 9,525,293 B2 | 12/2016 | Ito et al. |
| 9,537,336 B2 | 1/2017 | Suzuki et al. |
| 9,566,954 B2 | 2/2017 | Moskowitz |
| 9,711,868 B2 | 7/2017 | Scheucher |
| 9,758,030 B2 | 9/2017 | Newman |
| 9,770,996 B2 | 9/2017 | Chen et al. |
| 9,834,183 B2 | 12/2017 | Moskowitz |
| 9,857,863 B2 | 1/2018 | Kobayashi |
| 9,866,046 B2 | 1/2018 | Ito et al. |
| 9,868,421 B2 | 1/2018 | Hassounah |
| 9,908,506 B2 | 3/2018 | Taylor et al. |
| 9,932,019 B2 | 4/2018 | Hassounah |
| 9,937,818 B2 | 4/2018 | Newman |
| 9,960,637 B2 | 5/2018 | Sanders et al. |
| 10,040,359 B2 | 8/2018 | Chen et al. |
| 10,040,364 B2 | 8/2018 | Nishi et al. |
| 10,084,329 B2 | 9/2018 | Hamilton et al. |
| 10,110,029 B2 | 10/2018 | Toya |
| 10,144,307 B2 | 12/2018 | Newman et al. |
| 10,160,344 B2 | 12/2018 | Newman |
| 10,169,783 B2 | 1/2019 | Khoo et al. |
| 10,185,977 B2 | 1/2019 | Khoo et al. |
| 10,185,978 B2 | 1/2019 | Khoo et al. |
| 10,192,245 B2 | 1/2019 | Khoo et al. |
| 10,210,552 B2 | 2/2019 | Khoo et al. |
| 10,288,439 B2 | 5/2019 | Pederson |
| 10,345,843 B2 | 7/2019 | Luke et al. |
| 10,387,688 B2 | 8/2019 | Toya |
| 10,406,931 B2 | 9/2019 | Nakano et al. |
| 10,459,471 B2 | 10/2019 | Luke et al. |
| 10,467,827 B2 | 11/2019 | Taylor et al. |
| 10,476,284 B2 | 11/2019 | Suzuki et al. |
| 10,529,151 B2 | 1/2020 | Luke et al. |
| 10,532,667 B2 | 1/2020 | Chen et al. |
| 10,546,438 B2 | 1/2020 | Chen et al. |
| 10,549,729 B2 | 2/2020 | Moskowitz |
| 10,551,442 B2 | 2/2020 | Horie et al. |
| 10,573,103 B2 | 2/2020 | Taylor et al. |
| 10,586,258 B2 | 3/2020 | Khoo et al. |
| 10,622,834 B2 | 4/2020 | Sanders et al. |
| 10,622,835 B2 | 4/2020 | Sanders et al. |
| 10,661,676 B2 | 5/2020 | Takatsuka et al. |
| 10,719,867 B2 | 7/2020 | Uchida |
| 10,763,692 B2 | 9/2020 | Pelletier et al. |
| 10,819,145 B2 | 10/2020 | Luke et al. |
| 10,839,433 B2 | 11/2020 | Khoo et al. |
| 10,846,674 B2 | 11/2020 | Rayner |
| 10,846,763 B2 | 11/2020 | Khoo et al. |
| 10,861,066 B2 | 12/2020 | Khoo et al. |
| 10,866,108 B2 | 12/2020 | Pederson |
| 10,872,361 B2 | 12/2020 | Khoo et al. |
| 10,894,484 B2 | 1/2021 | Han et al. |
| 10,926,742 B2 | 2/2021 | Lai et al. |
| 10,992,155 B2 | 2/2021 | Meriac et al. |
| 10,935,606 B2 | 3/2021 | Takatsuka et al. |
| 10,938,221 B1 | 3/2021 | Tenorio |
| 10,944,278 B1 | 3/2021 | Kang et al. |
| 10,944,279 B1 | 3/2021 | Chen et al. |
| 11,002,557 B2 | 5/2021 | Pederson |
| 11,014,468 B2 | 5/2021 | Shiiyama et al. |
| 11,084,365 B2 | 8/2021 | Chen et al. |
| 11,095,140 B1 | 8/2021 | Chen et al. |
| 11,097,632 B2 | 8/2021 | Üyeki |
| 11,101,677 B2 | 8/2021 | Shih et al. |
| 11,133,690 B1 | 9/2021 | Chen et al. |
| 11,136,008 B2 | 10/2021 | Lai et al. |
| 11,139,684 B2 | 10/2021 | Wu et al. |
| 11,169,555 B2 | 11/2021 | Luke et al. |
| 11,180,049 B2 | 11/2021 | Kim et al. |
| 11,203,266 B2 | 12/2021 | Ikui et al. |
| 11,239,674 B2 | 2/2022 | Hamilton, IV et al. |
| 11,258,301 B2 | 2/2022 | Sanders et al. |

(56) References Cited

U.S. PATENT DOCUMENTS

| | | |
|---|---|---|
| 11,271,425 B2 | 3/2022 | Sanders et al. |
| 11,315,057 B2 | 4/2022 | Ikui |
| 11,403,609 B2 | 8/2022 | Rayner |
| 11,422,000 B2 | 8/2022 | Pederson |
| 11,423,378 B2 | 8/2022 | Rayner |
| 11,861,638 B2 * | 1/2024 | Hidaka .............. G07C 9/00309 |
| 11,862,987 B2 * | 1/2024 | Daga .................. H01M 50/512 |
| 11,916,419 B2 * | 2/2024 | Takahashi ............ H02J 7/0047 |
| 12,001,983 B2 * | 6/2024 | Ikui ...................... H02J 7/0013 |
| 2001/0020838 A1 | 9/2001 | Malackowski |
| 2002/0008284 A1 * | 1/2002 | Zeng .................. H01L 29/7813 |
| | | 257/E29.066 |
| 2003/0209375 A1 | 11/2003 | Suzuki et al. |
| 2007/0182576 A1 | 8/2007 | Proska et al. |
| 2007/0188130 A1 | 8/2007 | Scheucher |
| 2007/0188137 A1 | 8/2007 | Scheucher |
| 2008/0007211 A1 * | 1/2008 | Poisner ................ H02J 7/0045 |
| | | 320/107 |
| 2008/0053716 A1 | 3/2008 | Scheucher |
| 2008/0157722 A1 | 7/2008 | Nobutaka et al. |
| 2008/0258682 A1 | 10/2008 | Li |
| 2009/0198372 A1 | 8/2009 | Hammerslag |
| 2010/0071979 A1 | 3/2010 | Heichal et al. |
| 2010/0094496 A1 | 4/2010 | Hershkovitz et al. |
| 2010/0112843 A1 | 5/2010 | Heichal et al. |
| 2010/0141206 A1 | 6/2010 | Agassi et al. |
| 2010/0201307 A1 * | 8/2010 | Poisner ................ H02J 7/0045 |
| | | 320/160 |
| 2010/0250043 A1 | 9/2010 | Scheucher |
| 2011/0044791 A1 | 2/2011 | Agassi et al. |
| 2011/0106294 A1 | 5/2011 | Bebbington |
| 2011/0221384 A1 | 9/2011 | Scheucher |
| 2011/0297470 A1 | 12/2011 | Heichal et al. |
| 2011/0303509 A1 | 12/2011 | Agassi et al. |
| 2012/0009804 A1 | 1/2012 | Heichal et al. |
| 2012/0080941 A1 | 4/2012 | Scheucher |
| 2012/0233850 A1 | 9/2012 | Hozumi et al. |
| 2012/0299531 A1 | 11/2012 | Prosser et al. |
| 2012/0299544 A1 | 11/2012 | Prosser et al. |
| 2012/0303213 A1 | 11/2012 | Prosser et al. |
| 2012/0303259 A1 | 11/2012 | Prosser |
| 2012/0303397 A1 | 11/2012 | Prosser |
| 2012/0316671 A1 | 12/2012 | Hammerslag et al. |
| 2013/0027183 A1 | 1/2013 | Wu et al. |
| 2013/0030608 A1 | 1/2013 | Taylor et al. |
| 2013/0031318 A1 | 1/2013 | Chen et al. |
| 2013/0046457 A1 | 2/2013 | Pettersson |
| 2013/0110296 A1 | 5/2013 | Khoo et al. |
| 2013/0153315 A1 | 6/2013 | Yu et al. |
| 2014/0012462 A1 | 1/2014 | Chen et al. |
| 2014/0053620 A1 | 2/2014 | Taylor et al. |
| 2014/0163813 A1 | 6/2014 | Chen et al. |
| 2014/0312845 A1 | 10/2014 | Scheucher |
| 2014/0316939 A1 | 10/2014 | Uyeki |
| 2014/0350716 A1 * | 11/2014 | Fly ............................ B25H 3/00 |
| | | 700/214 |
| 2014/0361740 A1 | 12/2014 | Suzuki et al. |
| 2015/0015205 A1 | 1/2015 | Ito et al. |
| 2015/0042157 A1 | 2/2015 | Chen et al. |
| 2015/0123468 A1 | 5/2015 | Wu et al. |
| 2015/0134142 A1 | 5/2015 | Taylor et al. |
| 2015/0149015 A1 | 5/2015 | Nakano et al. |
| 2015/0153967 A1 | 6/2015 | Chen et al. |
| 2015/0165917 A1 | 6/2015 | Robers et al. |
| 2015/0249353 A1 | 9/2015 | Hamilton, IV et al. |
| 2015/0306967 A1 | 10/2015 | Cohen |
| 2015/0336465 A1 | 11/2015 | Luke et al. |
| 2016/0001748 A1 | 1/2016 | Moskowitz |
| 2016/0068075 A1 | 3/2016 | Chen et al. |
| 2016/0075247 A1 | 3/2016 | Uyeki |
| 2016/0099590 A1 * | 4/2016 | Velderman ................ G07F 7/06 |
| | | 320/113 |
| 2016/0145903 A1 | 5/2016 | Taylor et al. |
| 2016/0178678 A1 | 6/2016 | Pelletier et al. |
| 2016/0190866 A1 | 6/2016 | Pelletier et al. |
| 2016/0280089 A1 | 9/2016 | Uyeki et al. |
| 2016/0292937 A1 | 10/2016 | Taylor et al. |
| 2016/0339792 A1 | 11/2016 | Khoo et al. |
| 2016/0339793 A1 | 11/2016 | Khoo et al. |
| 2016/0347281 A1 | 12/2016 | Wu et al. |
| 2016/0362016 A1 | 12/2016 | Khoo et al. |
| 2016/0364658 A1 | 12/2016 | Khoo et al. |
| 2016/0364776 A1 | 12/2016 | Khoo et al. |
| 2016/0368464 A1 | 12/2016 | Hassounah |
| 2017/0005474 A1 | 1/2017 | Sanders et al. |
| 2017/0005477 A1 | 1/2017 | Sanders et al. |
| 2017/0005515 A1 | 1/2017 | Sanders et al. |
| 2017/0070067 A1 | 3/2017 | Suzuki et al. |
| 2017/0070068 A1 | 3/2017 | Ito et al. |
| 2017/0097652 A1 | 4/2017 | Luke et al. |
| 2017/0113661 A1 | 4/2017 | Moskowitz |
| 2017/0193250 A1 | 7/2017 | Toya |
| 2017/0201110 A1 | 7/2017 | Toya |
| 2017/0217326 A1 | 8/2017 | Nishi et al. |
| 2017/0225557 A1 | 8/2017 | Newman |
| 2017/0225587 A1 | 8/2017 | Newman |
| 2017/0225588 A1 | 8/2017 | Newman |
| 2017/0225662 A1 | 8/2017 | Newman et al. |
| 2017/0355354 A1 | 12/2017 | Hassounah |
| 2018/0045786 A1 | 2/2018 | Takatsuka et al. |
| 2018/0118174 A1 | 5/2018 | Moskowitz |
| 2018/0178669 A1 | 6/2018 | Kudo et al. |
| 2018/0182188 A1 | 6/2018 | Luke et al. |
| 2018/0222343 A1 | 8/2018 | Uchida |
| 2018/0257603 A1 | 9/2018 | Taylor et al. |
| 2018/0262019 A1 | 9/2018 | Homma |
| 2018/0272990 A1 | 9/2018 | Chen et al. |
| 2019/0006862 A1 | 1/2019 | Hamilton, IV et al. |
| 2019/0023138 A1 | 1/2019 | Takatsuka et al. |
| 2019/0028903 A1 | 1/2019 | Carpenter et al. |
| 2019/0028904 A1 | 1/2019 | Carpenter et al. |
| 2019/0061552 A1 | 2/2019 | Amari et al. |
| 2019/0126775 A1 | 5/2019 | Han et al. |
| 2019/0139107 A1 | 5/2019 | Khoo et al. |
| 2019/0148690 A1 | 5/2019 | Newman |
| 2019/0156382 A1 | 5/2019 | Khoo et al. |
| 2019/0156383 A1 | 5/2019 | Khoo et al. |
| 2019/0156384 A1 | 5/2019 | Khoo et al. |
| 2019/0168627 A1 | 6/2019 | Chen et al. |
| 2019/0180336 A1 | 6/2019 | Khoo et al. |
| 2019/0202415 A1 | 7/2019 | Lai et al. |
| 2019/0202416 A1 | 7/2019 | Lai et al. |
| 2019/0207393 A1 | 7/2019 | Shih et al. |
| 2019/0207398 A1 | 7/2019 | Shih et al. |
| 2019/0213809 A1 | 7/2019 | Luke et al. |
| 2019/0261194 A1 | 8/2019 | Carpenter et al. |
| 2019/0287324 A1 | 9/2019 | Wu et al. |
| 2019/0288555 A1 | 9/2019 | Sanders et al. |
| 2019/0288556 A1 | 9/2019 | Sanders et al. |
| 2019/0316930 A1 | 10/2019 | Luke et al. |
| 2019/0333037 A1 | 10/2019 | Rayner |
| 2019/0359076 A1 | 11/2019 | Nakano et al. |
| 2019/0387416 A1 | 12/2019 | Carpenter et al. |
| 2020/0001738 A1 | 1/2020 | Sohmshetty et al. |
| 2020/0009984 A1 | 1/2020 | Shiiyama et al. |
| 2020/0035046 A1 | 1/2020 | Luke et al. |
| 2020/0084639 A1 | 3/2020 | Carpenter et al. |
| 2020/0164760 A1 | 5/2020 | Sohmshetty et al. |
| 2020/0198494 A1 | 6/2020 | Chen et al. |
| 2020/0231058 A1 | 7/2020 | Hishida et al. |
| 2020/0235602 A1 | 7/2020 | Hishida et al. |
| 2020/0244089 A1 | 7/2020 | Nishida |
| 2020/0244100 A1 | 7/2020 | Sanders et al. |
| 2020/0343764 A1 | 10/2020 | Sanders et al. |
| 2020/0384879 A1 | 12/2020 | Ebisu et al. |
| 2020/0391602 A1 | 12/2020 | Ikui et al. |
| 2020/0402075 A1 | 12/2020 | Ebisu et al. |
| 2021/0019720 A1 | 1/2021 | Rayner |
| 2021/0035077 A1 | 2/2021 | Rayner |
| 2021/0061124 A1 | 3/2021 | Kim et al. |
| 2021/0073876 A1 | 3/2021 | Khoo et al. |
| 2021/0090139 A1 | 3/2021 | Khoo et al. |
| 2021/0090140 A1 | 3/2021 | Khoo et al. |

(56) References Cited

U.S. PATENT DOCUMENTS

| | | | |
|---|---|---|---|
| 2021/0090141 A1 | 3/2021 | Khoo et al. | |
| 2021/0110446 A1 | 4/2021 | Khoo et al. | |
| 2021/0192645 A1 | 6/2021 | Kawamura et al. | |
| 2021/0248535 A1 | 8/2021 | Ikui | |
| 2021/0257847 A1* | 8/2021 | Takahashi | B60L 53/65 |
| 2021/0261013 A1 | 8/2021 | Kazuno | |
| 2021/0276449 A1 | 9/2021 | Kazuno | |
| 2021/0376629 A1 | 12/2021 | Chen et al. | |
| 2022/0001767 A1 | 1/2022 | Kim et al. | |
| 2022/0021220 A1 | 1/2022 | Matsumoto et al. | |
| 2022/0045546 A1 | 2/2022 | Ikui et al. | |
| 2022/0230111 A1 | 7/2022 | Ikui | |
| 2022/0261829 A1 | 8/2022 | Hidaka et al. | |
| 2022/0305949 A1* | 9/2022 | Liu | B60W 10/20 |
| 2023/0080952 A1* | 3/2023 | Okawa | B60L 53/80 |
| | | | 320/107 |
| 2023/0179026 A1* | 6/2023 | Daga | B60L 53/68 |
| | | | 320/108 |
| 2023/0417837 A1* | 12/2023 | Lee | B60L 58/12 |
| 2024/0083394 A1* | 3/2024 | Zhang | B60L 53/80 |
| 2024/0100987 A1* | 3/2024 | Lu | B61L 27/10 |

FOREIGN PATENT DOCUMENTS

| | | |
|---|---|---|
| CN | 102129640 | 7/2011 |
| CN | 104160546 | 11/2014 |
| CN | 105493378 | 4/2016 |
| CN | 205862454 | 1/2017 |
| CN | 107026484 | 8/2017 |
| CN | 107128194 | 9/2017 |
| CN | 107599882 | 1/2018 |
| CN | 107757408 | 3/2018 |
| CN | 107945397 | 4/2018 |
| EP | 0902521 | 3/1999 |
| EP | 3018789 A2 | 5/2016 |
| JP | 10-293874 | 11/1998 |
| JP | 11-098699 | 4/1999 |
| JP | 11-150809 | 6/1999 |
| JP | 2001-057711 | 2/2001 |
| JP | 2001-283931 | 10/2001 |
| JP | 2009-542190 | 11/2009 |
| JP | 2010-212048 | 9/2010 |
| JP | 2011-103048 | 5/2011 |
| JP | 2011-146921 | 7/2011 |
| JP | 2015-015827 | 1/2015 |
| JP | 105667464 | 6/2016 |
| JP | 2017-135922 | 8/2017 |
| JP | 2019-068552 | 4/2019 |
| WO | 2008/005813 | 1/2008 |
| WO | 2013/080211 | 6/2013 |
| WO | 2015/001930 A1 | 1/2015 |
| WO | 2020/111915 | 6/2020 |

OTHER PUBLICATIONS

Japanese Office Action for Japanese Patent Application No. 2021-184277 mailed Nov. 21, 2023.
International Search Report and Written Opinion for International Application No. PCT/JP2019/046821 mailed on Mar. 3, 2020, 15 pages.
Japanese Notice of Allowance for Japanese Patent Application No. 2020-557858 mailed Oct. 12, 2021.
Extended European Search Report for European Patent Application No. 19891426.9 mailed Dec. 10, 2021.
Extended European Search Report for European Patent Application No. 19891426.9 mailed Apr. 8, 2022.
Japanese Decision to Grant a Patent for Japanese Patent Application No. 2020-557858 dated Oct. 12, 2021.
Japanese Decision to Grant a Patent for Japanese Patent Application No. 2021-184276 dated Apr. 19, 2022.
Non-Final Office Action for U.S. Appl. No. 17/296,566 mailed Sep. 22, 2022.

* cited by examiner

FIG. 5

| | | |
|---|---|---|
| SLOT ID AND BATTERY ID | SLOT ID=1 | BATTERY ID=2018000001 |
| | SLOT ID=2 | BATTERY ID=2007123456 |
| | SLOT ID=3 | BATTERY ID=20184626462 |
| | SLOT ID=4 | BATTERY ID=2017234567 |
| | SLOT ID=5 | BATTERY ID=20183333333 |
| | SLOT ID=6 | BATTERY ID=20177685761 |
| | SLOT ID=7 | BATTERY ID=20180304050 |
| | SLOT ID=8 | BATTERY ID=2017182456 |
| BATTERY REPLACEMENT DEVICE ID | BATTERY REPLACEMENT DEVICE ID=002345 | |

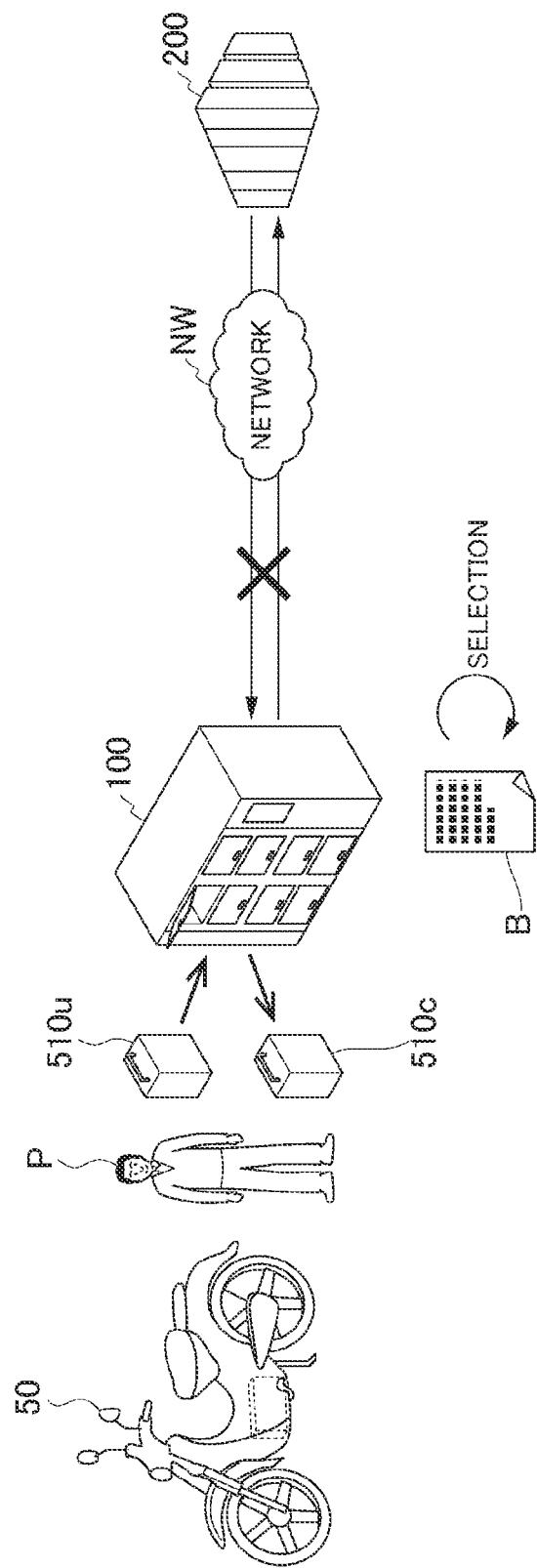

FIG. 9

| | | |
|---|---|---|
| SLOT ID AND BATTERY STATE INFORMATION | SLOT ID=1 | (CHARGING COMPLETED) CHARGING RATE100% |
| | SLOT ID=2 | (CHARGING COMPLETED) CHARGING RATE100% |
| | SLOT ID=3 | (CHARGING IN PROGRESS) CHARGING RATE78% |
| | SLOT ID=4 | (CHARGING IN PROGRESS) CHARGING RATE77% |
| | SLOT ID=5 | (CHARGING IN PROGRESS) CHARGING RATE65% |
| | SLOT ID=6 | (CHARGING IN PROGRESS) CHARGING RATE63% |
| | SLOT ID=7 | (CHARGING ON STANDBY) CHARGING RATE20% |
| | SLOT ID=8 | (CHARGING ON STANDBY) CHARGING RATE21% |
| BATTERY REPLACEMENT DEVICE ID | BATTERY REPLACEMENT DEVICE ID=002345 | |

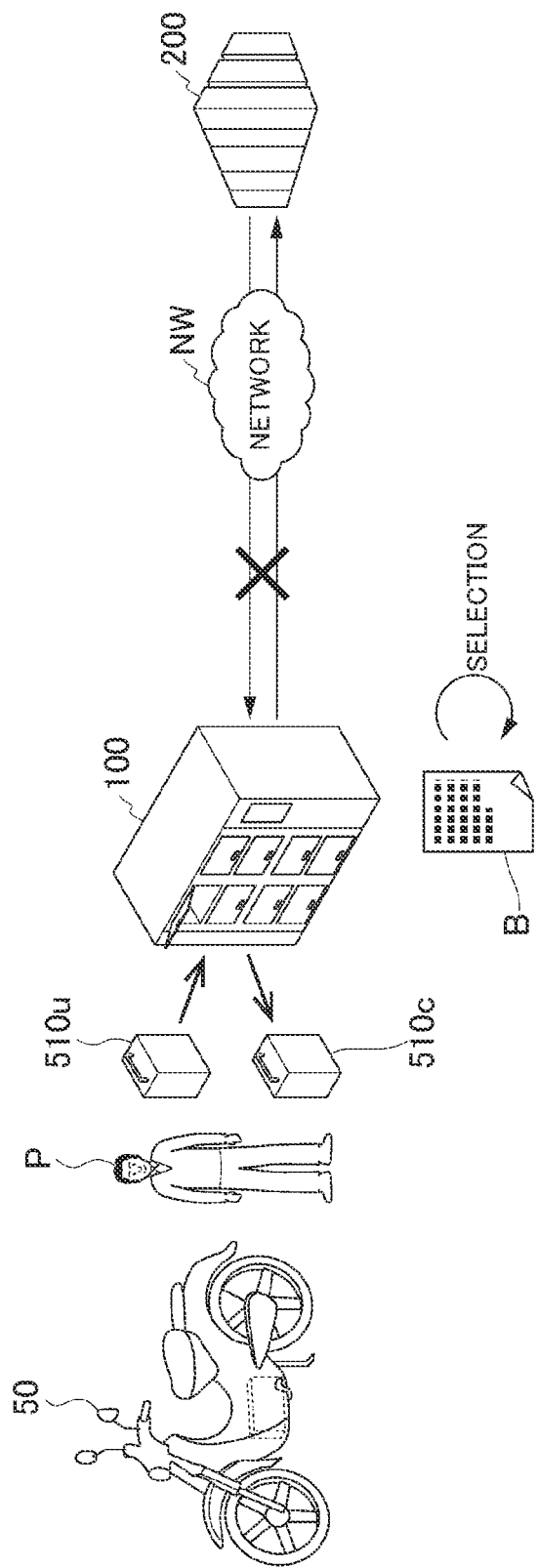

BATTERY USE SYSTEM, CHARGING DEVICE, INFORMATION PROCESSING DEVICE, BATTERY USE METHOD, PROGRAM, AND STORAGE MEDIUM

CROSS-REFERENCE TO RELATED APPLICATIONS

This application is a Continuation of application Ser. No. 17/296,566 filed on May 25, 2021, which is a Section 371 National Phase of PCT International application No. PCT/JP2019/046821 filed on Nov. 29, 2019, the entire content of both of which are incorporated herein by reference.

Priority is claimed on Japanese Patent Application No. 2018-223833 and Japanese Patent Application No. 2018-223834, both filed Nov. 29, 2018, the entire content of both of which are incorporated herein by reference.

TECHNICAL FIELD

The present invention relates to a battery use system, a charging device, an information processing device, a battery use method, a program, and a storage medium.

Priority is claimed on Japanese Patent Application Nos. 2018-223833 and 2018-223834, filed Nov. 29, 2018, the content of which is incorporated herein by reference.

BACKGROUND ART

In recent years, electric vehicles such as electric vehicles (EVs) and hybrid electric vehicles (HEVs), which travel using electric motors driven with electric power supplied from batteries, have been developed. In the electric vehicles, when a battery, which is a drive source, has run out of power, it is necessary to charge the battery to continue subsequent traveling.

Incidentally, some of recent electric vehicles adopt batteries configured to be removable (hereinafter referred to as "removable batteries"). When a currently mounted removable battery has run out of power in an electric vehicle adopting a removable battery, it is possible to continue traveling by performing replacement with another removable battery storing sufficient electric power such as a spare removable battery whose charging is completed. The development of a so-called battery sharing service in which a removable battery is shared by a plurality of users using electric vehicles has been studied.

In the above-described battery sharing service, the user replaces the removable battery at charging stations installed at a plurality of locations. At the charging station, a returned removable battery is charged and stored, and the charged removable battery is rented out when another user comes to replace a removable battery (see, for example, Patent Document 1).

As another example of a movable object from which a battery can be removed, a portable power charging/supplying device including a battery and a power charging/supplying unit in which an accommodation chamber for accommodating the battery is formed is known (see, for example, Patent Document 2).

CITATION LIST

Patent Document

[Patent Document 1]
Japanese Unexamined Patent Application, First Publication No. 2001-57711

[Patent Document 2]
Japanese Unexamined Patent Application, First Publication No. 2019-068552

SUMMARY OF INVENTION

Technical Problem

Here, after a system is operated, a battery manufacturer may notify that a lot has a defect with respect to batteries. However, in the conventional technology, because a returned battery is charged and the charged battery is rented out to another user, it may not be possible to avoid charging of a battery from a defective lot.

Also, in the conventional technology, electric power capable of being supplied to a battery replacement device for charging a removable battery may differ according to an environment in which a charging station is installed. For example, when the charging station is operated for a limited period, the existing electrical equipment may be utilized without the construction of electrical equipment. For example, a battery replacement device has a plurality of slots for accommodating removable batteries. In this case, electric power for charging all the removable batteries respectively accommodated in the slots may be insufficient.

As described above, in the conventional technology, it is difficult to appropriately charge a battery according to various situations.

Aspects of the present invention have been made in view of the above problems and an objective of the present invention is to provide a battery use system, a charging device, an information processing device, a battery use method, a program, and a storage medium capable of appropriately charging a battery according to various situations.

Solution to Problem

A battery use system, a charging device, an information processing device, a battery use method, a program, and a storage medium according to the present invention adopt the following configurations.

(1) According to an aspect of the present invention, there is provided a battery use system including: a battery removably mounted on an electric power device using electric power; a charging device configured to charge the battery; and a server configured to communicate with the charging device, wherein the charging device includes a first communicator configured to communicate with the server; a plurality of accommodation units configured to accommodate the battery; an acquirer configured to acquire identification information of the battery accommodated in the accommodation unit; and a first controller configured to transmit the identification information acquired by the acquirer to the server via the first communicator and control charging of the battery and/or detachment of the battery for each accommodation unit on the basis of reception information received by the first communicator from the server, and wherein the server includes a second communicator configured to communicate with the charging device; and a second controller configured to determine whether or not the charging of the battery and/or the detachment of the battery accommodated in each of the plurality of accommodation units are available on the basis of the identification information received by the second communicator and provision information provided from an information provider and transmit transmission information on an availability determination result to the charging device via the second communicator.

(2) In the aspect (1), the provision information includes first identification information which is the identification information of the battery whose charging and/or detachment should be prohibited, and, when second identification information, which is the identification information received by the second communicator, is identical with the first identification information, the second controller is configured to determine that the charging of the battery and/or the detachment of the battery corresponding to the second identification information identical with the first identification information are unavailable and transmit the transmission information on a determination result of determining that the charging of the battery and/or the detachment of the battery are unavailable to the charging device via the second communicator.

(3) In the aspect (2), the first controller is configured to prohibit the charging of the battery and/or the detachment of the battery corresponding to the second identification information identical with the first identification information on the basis of the reception information received by the first communicator from the server.

(4) In any one of the aspects (1) to (3), the second controller is configured to determine whether or not the detachment of the battery accommodated in each of the plurality of accommodation unit is available on the basis of the identification information and the provision information and transmit the transmission information on an availability determination result to the charging device via the second communicator, and the first controller is configured to prohibit the detachment of the battery for each accommodation unit on the basis of the reception information received by the first communicator from the server.

(5) In any one of the aspects (1) to (4), the charging device further includes a storage configured to store information, the second controller is configured to generate corresponding information in which an order of the battery to be preferentially detached from the accommodation unit is associated with the identification information of each of a plurality of batteries capable of being detached from the accommodation unit on the basis of the identification information received by the second communicator and transmit the generated corresponding information to the charging device via the second communicator, and the first controller is configured to cause the storage to store the corresponding information received by the first communicator and control the detachment of the battery for each accommodation unit on the basis of the corresponding information stored in the storage.

(6) In any one of the aspects (1) to (5), the acquirer is configured to acquire the identification information from the battery newly accommodated in the accommodation unit when the battery has been newly accommodated in the accommodation unit where the battery was not accommodated, and the first controller is configured to transmit the identification information newly acquired by the acquirer to the server via the first communicator when the identification information has been newly acquired by the acquirer.

(7) In any one of the aspects (1) to (6), the acquirer further is configured to acquire incidental information including at least one of the number of times the battery has been charged, a state of deterioration of the battery, and a charging rate of the battery; and the first controller transmit the incidental information acquired by the acquirer to the server via the first communicator.

(8) In any one of the aspects (1) to (7), the charging device further includes another acquirer configured to acquire charging device information including at least one of information representing that the battery is not accommodated in the accommodation unit, information representing that the accommodation unit has failed, and information representing that the charging device has failed, and the first controller transmit the charging device information acquired by the other acquirer to the server via the first communicator.

(9) According to yet another aspect of the present invention, there is provided an information processing device including: a communicator configured to receive identification information of a battery accommodated in an accommodation unit from a charging device including a plurality of accommodation units, which is configured to accommodate the battery removably mounted on an electric power device using electric power, and configured to charge the battery accommodated in the accommodation unit; and a controller configured to determine whether or not charging of the battery and/or detachment of the battery accommodated in each of the plurality of accommodation units are available on the basis of the identification information received by the communicator and provision information provided from an information provider and transmit transmission information for causing the charging device to control the charging of the battery and/or the detachment of the battery for each accommodation unit on the basis of an availability determination result to the charging device via the communicator.

(10) According to still another aspect of the present invention, there is provided a battery use method including: a process in which a computer, which includes a communicator configured to receive identification information of a battery accommodated in an accommodation unit from a charging device including a plurality of accommodation units, which is configured to accommodate the battery removably mounted on an electric power device using electric power, and configured to charge the battery accommodated in the accommodation unit, is configured to determine whether or not charging of the battery and/or detachment of the battery accommodated in each of the plurality of accommodation units are available on the basis of the identification information received by the communicator and provision information provided from an information provider; and a process in which the computer is configured to transmit transmission information for causing the charging device to control the charging of the battery and/or the detachment of the battery for each accommodation unit on the basis of an availability determination result to the charging device via the communicator.

(11) According to still another aspect of the present invention, there is provided a program for causing a computer, which includes a communicator configured to receive identification information of a battery accommodated in an accommodation unit from a charging device including a plurality of accommodation units, which is configured to accommodate the battery removably mounted on an electric power device using electric power, and configured to charge the battery accommodated in the accommodation unit, to execute: a process of determining whether or not charging of the battery and/or detachment of the battery accommodated in each of the plurality of accommodation units are available on the basis of the identification information received by the communicator and provision information provided from an information provider; and a process of transmitting transmission information for causing the charging device to control the charging of the battery and/or the detachment of the battery for each accommodation unit on the basis of an availability determination result to the charging device via the communicator.

(12) According to still another aspect of the present invention, there is provided a battery use system including: a battery removably mounted on an electric power device using electric power; a charging device configured to charge the battery; and a server configured to communicate with the charging device, wherein the charging device includes a first communicator configured to communicate with the server; a plurality of accommodation units configured to accommodate the battery; an acquirer configured to acquire identification information of the accommodation unit where the battery is accommodated among the plurality of accommodation units; and a first controller configured to transmit the identification information acquired by the acquirer to the server via the first communicator and control charging of the battery for each accommodation unit on the basis of reception information received by the first communicator from the server, and wherein the server includes a second communicator configured to communicate with the charging device; and a second controller configured to determine whether or not the charging of the battery accommodated in each of the plurality of accommodation units is available on the basis of the identification information received by the second communicator and receivable power, which is electric power capable of being externally received by the charging device, and transmit transmission information on an availability determination result to the charging device via the second communicator.

(13) According to the aspect (12), the second controller is configured to compare the number of accommodations which is the number of accommodation units corresponding to the identification information received by the second communicator with an upper limit number which is the number of accommodation units in which batteries are able to be simultaneously charged obtained on the basis of the receivable power, and, when the number of accommodations is larger than the upper limit number, the second controller is configured to determine that the charging of the battery accommodated in the accommodation unit for a quantity by which the number of accommodations exceeds the upper limit number is unavailable and transmit the transmission information on a determination result of determining that the charging of the battery is unavailable to the charging device via the second communicator.

(14) In the aspect (13), the first controller is configured to prohibit the charging of the battery accommodated in the accommodation unit for the quantity by which the number of accommodations exceeds the upper limit number among a plurality of batteries accommodated in the accommodation units on the basis of the reception information received by the first communicator.

(15) In any one of the aspects (12) to (14), the second controller is configured to compare a total consumed electric current value when the battery accommodated in the accommodation unit corresponding to the identification information received by the second communicator is charged with an upper limit value of an electric current capable of being received by the charging device obtained on the basis of the receivable power, when the total consumed electric current value is larger than the upper limit value, the second controller is configured to determine that the charging of the battery for a quantity by which the total consumed electric current value exceeds the upper limit value is unavailable and transmit the transmission information on a determination result of determining that the charging of the battery is unavailable to the charging device via the second communicator, and the first controller is configured to prohibit the charging of the battery for the quantity by which the total consumed electric current value exceeds the upper limit value among a plurality of batteries accommodated in the accommodation units on the basis of the reception information received by the first communicator.

(16) In any one of the aspects (12) to (15), the second controller is configured to compare a sum of a total consumed electric power value when the battery accommodated in the accommodation unit corresponding to the identification information received by the second communicator is charged and an electric power value required to operate the charging device with an upper limit value of an electric current capable of being received by the charging device obtained on the basis of the receivable power, when the sum is larger than the upper limit value, the second controller is configured to determine that the charging of the battery for a quantity by which the sum exceeds the upper limit value is unavailable and transmit the transmission information on a determination result of determining that the charging of the battery is unavailable to the charging device via the second communicator, and the first controller is configured to prohibit the charging of the battery for the quantity by which the sum exceeds the upper limit value among a plurality of batteries accommodated in the accommodation units on the basis of the reception information received by the first communicator.

(17) In any one of the aspects (12) to (16), the charging device further includes a storage configured to store information, the acquirer further is configured to acquire battery identification information which is identification information of the battery accommodated in the accommodation unit, the first controller is further configured to transmit the battery identification information acquired by the acquirer to the server via the first communicator, the second controller is configured to generate corresponding information in which an order of the battery to be preferentially detached from the accommodation unit is associated with the battery identification information of each of a plurality of batteries capable of being detached from the accommodation unit on the basis of the battery identification information received by the second communicator and transmit the generated corresponding information to the charging device via the second communicator, and the first controller is configured to cause the storage to store the corresponding information received by the first communicator and control the detachment of the battery for each accommodation unit on the basis of the corresponding information stored in the storage.

(18) According to still another aspect of the present invention, there is provided a charging device for charging a battery removably mounted on an electric power device using electric power, the charging device including: a plurality of accommodation units configured to accommodate the battery; and a controller configured to determine whether or not charging of the battery accommodated in each of the plurality of accommodation units is available on the basis of receivable power, which is electric power capable of being externally received by the charging device and control the charging of the battery for each accommodation unit on the basis of an availability determination result.

(19) According to still another aspect of the present invention, there is provided an information processing device including: a communicator configured to receive identification information of an accommodation unit where a battery is accommodated from a charging device including a plurality of accommodation units, which is configured to accommodate the battery removably mounted on an electric power device using electric power, and configured to charge the battery accommodated in the accommodation unit; and a controller configured to determine whether or not charging of the battery accommodated in each of the plurality of accommodation units is available on the basis of the identification information received by the communicator and receivable power, which is electric power capable of being externally received by the charging device and transmit transmission information for causing the charging device to control the charging of the battery for each accommodation unit on the basis of an availability determination result to the charging device via the communicator.

(20) According to still another aspect of the present invention, there is provided a battery use method including: a process in which a computer, which includes a communicator configured to receive identification information of an accommodation unit where a battery is accommodated from a charging device including a plurality of accommodation units, which is configured to accommodate the battery removably mounted on an electric power device using electric power, and configured to charge the battery accommodated in the accommodation unit, is configured to determine whether or not charging of the battery accommodated in each of the plurality of accommodation units is available on the basis of the identification information received by the communicator and receivable power, which is electric power capable of being externally received by the charging device; and a process in which the computer transmits transmission information for causing the charging device to control the charging of the battery for each accommodation unit on the basis of an availability determination result to the charging device via the communicator.

(21) According to still another aspect of the present invention, there is provided a program for causing a computer, which includes a communicator configured to receive identification information of an accommodation unit where a battery is accommodated from a charging device including a plurality of accommodation units, which is configured to accommodate the battery removably mounted on an electric power device using electric power, and configured to charge the battery accommodated in the accommodation unit, to execute: a process of determining whether or not charging of the battery accommodated in each of the plurality of accommodation units is available on the basis of the identification information received by the communicator and receivable power, which is electric power capable of being externally received by the charging device; and a process of transmitting transmission information for causing the charging device to control the charging of the battery for each accommodation unit on the basis of an availability determination result to the charging device via the communicator.

(22) According to still another aspect of the present invention, there is provided a computer-readable storage medium storing the program according to the aspect (11) or (21).

Advantageous Effects of Invention

According to any one aspect described above, it is possible to appropriately charge a battery according to various situations.

BRIEF DESCRIPTION OF DRAWINGS

FIG. 5 is a diagram showing an example of a battery state list transmitted to the operation server by the battery replacement device according to the first embodiment.

FIG. 8 is a diagram showing a concept of a battery sharing service adopting a shared battery management system according to a modified example of the first embodiment.

FIG. 9 is a diagram showing an example of information included in a battery state list according to a second embodiment.

FIG. 14 is a diagram showing a concept of the battery sharing service adopting the shared battery management system according to the second modified example of the second embodiment.

DESCRIPTION OF EMBODIMENTS

Figure 1:
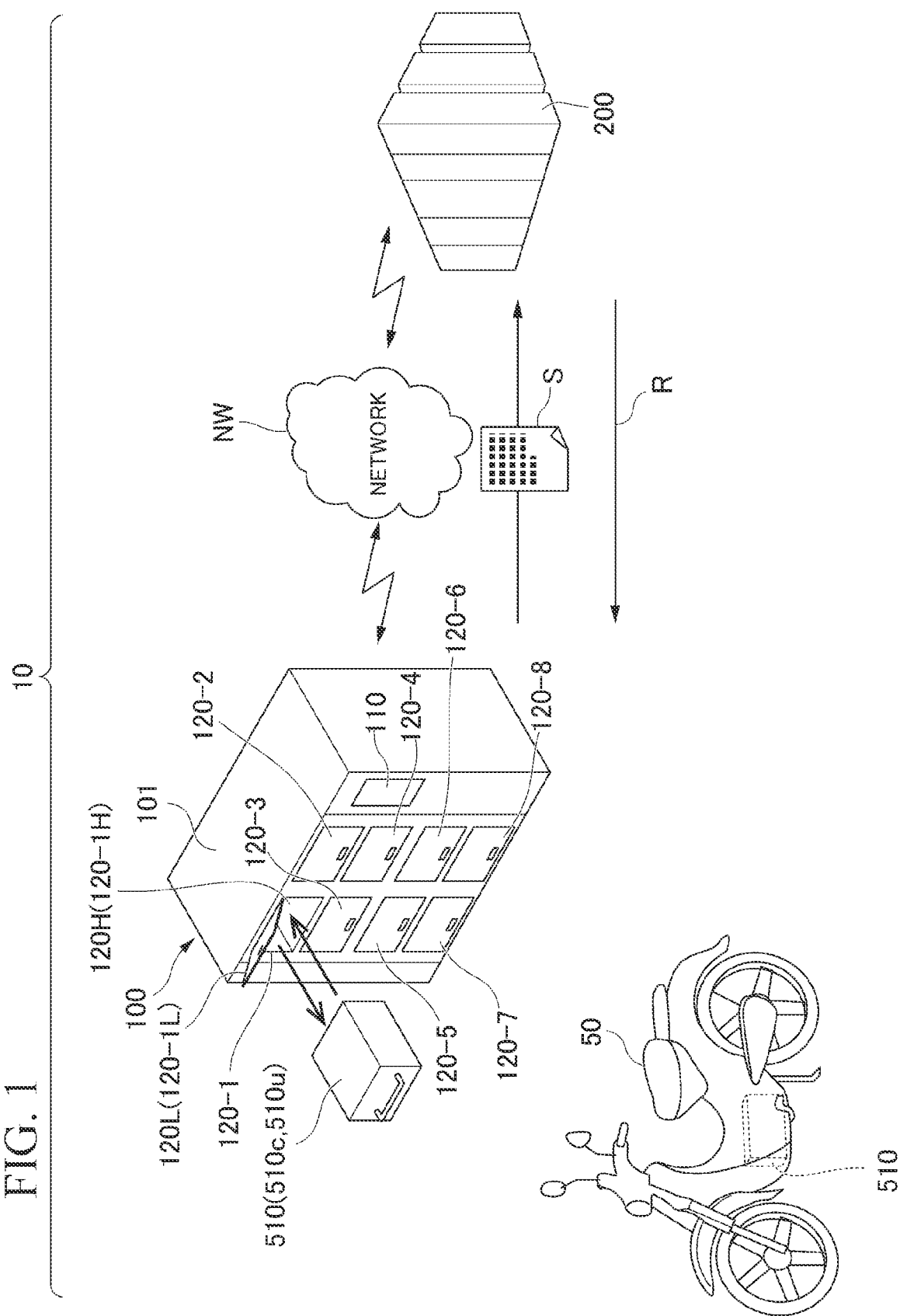
FIG. 1 is a diagram showing a concept of a battery sharing service adopting a shared battery management system according to a first embodiment.

Hereinafter, embodiments of the present invention will be described with reference to the drawings. In the drawings used in the following description, the scale of each member is appropriately changed to make each member recognizable. In the following description, a case in which a shared battery management system of the embodiment manages the replacement of a plurality of removable batteries shared by a plurality of saddle riding-type electric vehicles (hereinafter referred to as "electric motorcycles"), which have adopted a battery configured to be removable (hereinafter referred to as "removable battery") will be described.

First Embodiment

First, an example of an overall configuration of a shared battery management system according to a first embodiment will be described. FIG. 1 is a diagram showing a concept of a so-called battery sharing service adopting the shared battery management system according to the first embodiment. The shared battery management system is an example of a "battery use system."

As shown in FIG. 1, the shared battery management system 10 is configured to include a removable battery 510, a battery replacement device 100, and an operation server 200. Although one operation server 200 can be configured to correspond to a plurality of battery replacement devices 100 in the shared battery management system 10, only one battery replacement device 100 is shown in FIG. 1. In FIG. 1, an electric motorcycle 50 (an electric vehicle), which is an example of a movable device that uses a battery sharing service adopting the shared battery management system 10, is shown. The removable battery 510 is an example of a "battery," the battery replacement device 100 is an example of a "charging device," and the operation server 200 is an example of a "server" or an "information processing device."

The electric motorcycle 50 is an electric vehicle that travels using an electric motor driven with electric power supplied from a removable battery 510. The electric motorcycle 50 may be a hybrid electric vehicle that travels according to driving based on a combination of a removable battery 510 and an internal combustion engine such as a diesel engine or a gasoline engine. The electric motorcycle 50 is an example of an "electric power device."

The "electric power device" is not limited to the electric motorcycle 50 and may be, for example, a vehicle (a one-wheel vehicle, a three-wheel vehicle, a four-wheel vehicle, or the like) which can travel with electric power and on which a removable battery 510 can be removably mounted, or an assist-type bicycle. Instead of these vehicle-type movable objects, the "electric power device" may be a portable power charging/supplying device carried by a person or a vehicle described in Japanese Unexamined Patent Application, First Publication No. 2019-068552. Also, the "electric power device" may be a movable robot, an autonomous traveling device, an electric bicycle, an autonomous traveling vehicle, another electric vehicle, a drone flying object, or another electric movable device (electric mobility). Hereinafter, an example in which the "electric power device" is the electric motorcycle 50 will be described.

The removable battery 510 is, for example, a cassette-type power storage device (secondary battery) that is removably mounted on the electric motorcycle 50. At least one removable battery 510 is mounted on one electric motorcycle 50. In the following description, the electric motorcycle 50 will be described as an electric vehicle equipped with one removable battery 510.

The removable battery 510 is shared by a plurality of electric vehicles. Identification information (hereinafter referred to as a "battery ID" (battery identification information)) for identifying the removable battery 510 is exclusively assigned to the removable battery 510.

The battery ID may be a serial number (a manufacture's serial number) of the removable battery 510. The removable battery 510 is returned and stored in any one of slots 120-1 to 120-8 of the battery replacement device 100.

In the following description, when one of the slots 120-1 to 120-8 is not specified, it is referred to as a slot 120. In the following description, the removable battery 510 returned to the slot 120 by a user of the electric motorcycle 50 due to the consumption of electric power is referred to as a "used removable battery 510u." The removable battery 510 whose charging is completed by the battery replacement device 100 and which is taken out from the slot 120 by the user of the electric motorcycle 50 is referred to as a "charged removable battery 510c." In the first embodiment, the term "charged" means that the charging rate is not limited to 100% and the charging rate may be a predetermined value (for example, 80%) or more.

The battery replacement device 100 is installed within a charging/replacement station (not shown). For example, charging/replacement stations are installed at a plurality of locations. The battery replacement device 100 exchanges information with the operation server 200 through communication via the network NW and controls whether or not to perform charging and replacement of the removable battery 510.

More specifically, for example, when the used removable battery 510u has been returned, the battery replacement device 100 transmits a battery state list S in which information about stored and charged removable batteries 510 is recorded to the operation server 200 via the network NW.

The battery replacement device 100 receives an instruction R (a charging stop instruction or a rental prohibition instruction) for each slot 120 transmitted by the operation server 200. The battery state list S, the charging stop instruction (an instruction regarding whether or not charging is available), and a rental prohibition instruction will be described below.

When the charging stop instruction for each slot 120 transmitted by the operation server 200 has been received, the battery replacement device 100 performs control so that charging of the removable battery 510 of a target slot 120 is avoided based on the received charging stop instruction. The charging stop instruction received by the battery replacement device 100 from the operation server 200 is an example of "reception information."

When the rental prohibition instruction for each slot 120 transmitted by the operation server 200 has been received, the battery replacement device 100 performs control so that rental of the removable battery 510 of the target slot 120 is avoided based on the received rental prohibition instruction. The rental prohibition instruction received by the battery replacement device 100 from the operation server 200 is another example of the "reception information."

The battery replacement device 100 selects the removable battery 510 to be rented out from the charged removable batteries 510c accommodated in the slot 120 which is not included in each of the charging stop instruction and the rental prohibition instruction and rents out the selected removable battery 510.

FIG. 1 shows an example of a configuration of the battery replacement device 100. The battery replacement device 100 shown in FIG. 1 includes a display 110 and eight slots 120-1 to 120-8 including a charging function in a housing 101. Each slot 120 includes an accommodation unit 120H and an opening/closing lid 120L. The accommodation unit 120H includes a structure in which an opening is provided on a front surface thereof and the removable battery 510 can be moved in and out of the accommodation unit 120H through the opening. A connector 120T (FIG. 3) for acquiring the battery ID of the removable battery 510 when a connection with the accommodated removable battery 510 is made is provided on a back side of the accommodation unit 120H. The opening/closing lid 120L is a lid for opening/closing the opening on the front surface of the accommodation unit 120H and includes a structure in which the removable battery 510 can be moved in and out of the accommodation unit 120H when the opening is in an open state and the removable battery 510 cannot be moved in and out of the accommodation unit 120H when the opening is in a closed state. According to the above-described structure, each slot 120 can restrict the insertion/detachment or the rental of the removable battery 510 accommodated in the accommodation unit 120H by locking the opening/closing lid 120L in the closed state. That is, the battery replacement device 100 locks the opening/closing lid 120L to prohibit the removable battery 510 from being taken out from the accommodation unit 120H or unlocks the opening/closing lid 120L to permit the removable battery 510 to be taken out from the accommodation unit 120H.

The operation server 200 is a server facility that manages a removable battery 510 capable of being replaced by the battery replacement device 100. The operation server 200 generates a charging stop instruction or a rental prohibition instruction based on the information included in the battery state list S transmitted from the battery replacement device 100 and the information stored in the operation server. When the charging stop instruction or the rental prohibition instruction has been generated, the operation server 200 transmits the generated charging stop instruction or rental prohibition instruction to the battery replacement device 100. The information stored in the operation server is, for example, a battery ID of a removable battery 510 of a defective lot or the like. The charging stop instruction or the rental prohibition instruction transmitted by the operation server 200 to the battery replacement device 100 is an example of "transmission information."

(Configuration of Removable Battery 510)

Figure 2:
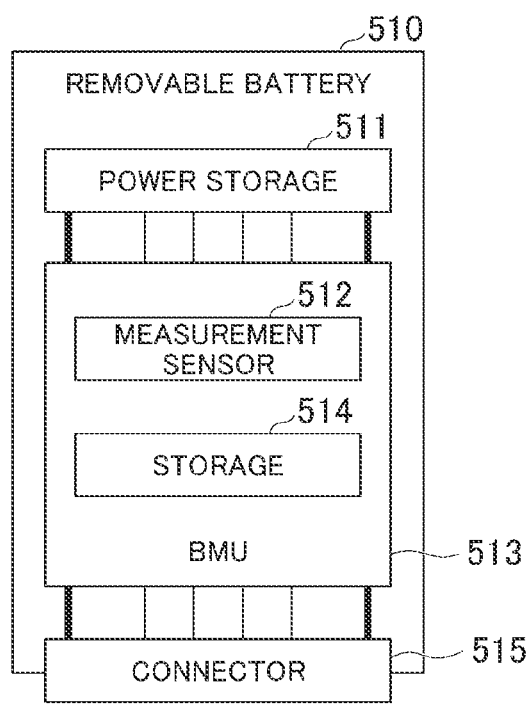
FIG. 2 is a block diagram showing an example of a configuration of a removable battery according to the first embodiment.

Next, an example of a configuration of the removable battery 510 will be described. FIG. 2 is a block diagram showing an example of the configuration of the removable battery 510 according to the present embodiment. As shown in FIG. 2, the removable battery 510 includes a power storage 511, a battery management unit (BMU) 513, and a connector 515. The BMU 513 includes a measurement sensor 512 and a storage 514.

The power storage 511 is configured to include a storage battery that stores electric power through charging and is discharged with the stored power. As the storage battery included in the power storage 511, for example, a secondary battery such as a lead storage battery or a lithium-ion battery, a capacitor such as an electric double layer capacitor, a composite battery in which a secondary battery and a capacitor are combined, or the like is used.

The measurement sensor 512 is configured to include various types of sensors for measuring the state of the power storage 511. The measurement sensor 512 measures a voltage stored in the power storage 511 using, for example, a voltage sensor. The measurement sensor 512 measures an electric current flowing through the power storage 511 using, for example, an electric current sensor. Also, the measurement sensor 512 measures a temperature at which the power storage 511 is charged or the power storage 511 is discharged using, for example, a temperature sensor. The measurement sensor 512 outputs a measured value representing a measured state of the power storage 511 to a processor on the BMU 513.

The BMU 513 is a battery management unit and controls charging and discharging of the power storage 511. The BMU 513 is configured to include a processor such as, for example, a central processing unit (CPU), and a memory such as, for example, a read only memory (ROM) or a random access memory (RAM), as the storage 514. In the BMU 513, the CPU implements a control function of the power storage 511 by reading and executing a program stored in the storage 514. The BMU 513 causes the storage 514 to store information such as content of the control performed on the power storage 511 based on the measured value representing the state of the power storage 511 output from the measurement sensor 512.

The storage 514 stores battery state information such as a battery ID assigned to the removable battery 510. In addition to the battery ID, the battery state information includes, for example, information such as the number of times of charging, a date of manufacture, a capacity in an initial state, and a charging rate. The storage 514 stores information such as an abnormality or a failure detected by the BMU 513 itself, an abnormality or a failure of the power storage 511 ascertained using the measurement sensor 512, and the like.

The connector 515 is a connector for supplying the electric power stored in the power storage 511 to the electric motor that is the drive source of the electric motorcycle 50 when the removable battery 510 has been mounted on the electric motorcycle 50. The connector 515 is connected to a structure that connects to the removable battery 510 provided on the back side of the accommodating portion 120H when the removable battery 510 has been accommodated in the slot 120 provided in the battery replacement device 100. The connector 515 is also a connector for transmitting information such as a battery ID exchanged, the number of times of charging, and a measured value indicating the state of the power storage 511 between the removable battery 510 and the battery replacement device 100 and transmitting electric power.

(Configuration of Battery Replacement Device 100)

Figure 3:
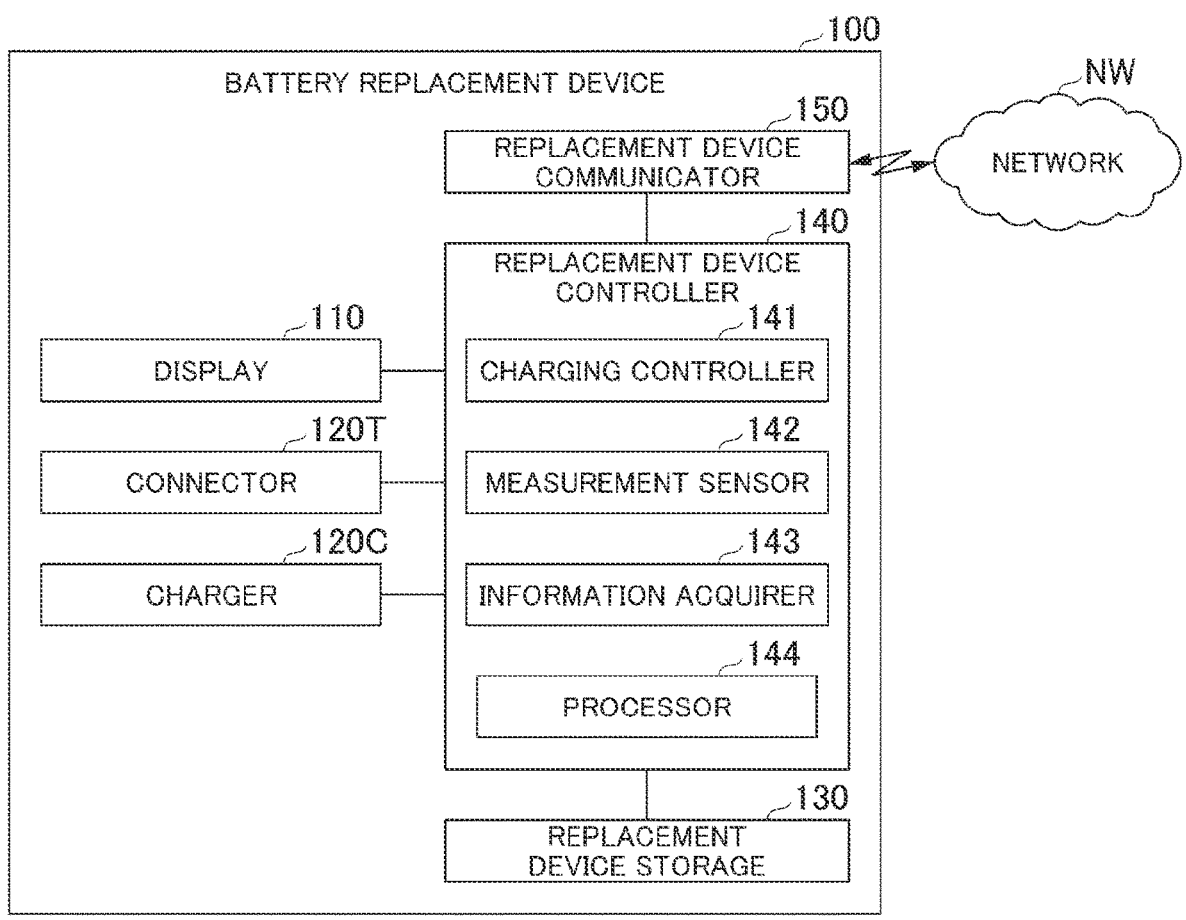
FIG. 3 is a block diagram showing a schematic configuration of a battery replacement device according to the first embodiment.

Subsequently, an example of a configuration of the battery replacement device 100 will be described. FIG. 3 is a block diagram showing a schematic configuration of the battery replacement device 100 according to the first embodiment. As shown in FIG. 3, the battery replacement device 100 includes a display 110, a connector 120T, a charger 120C, a replacement device storage 130, a replacement device controller 140, and a replacement device communicator 150. The replacement device controller 140 includes a charging controller 141, a measurement sensor 142, an information acquirer 143, and a processor 144. The replacement device controller 140 is an example of a "first controller" and the replacement device communicator 150 is an example of a "first communicator."

When the battery replacement device 100 includes eight slots 120 as shown in FIG. 1, slot IDs (slot identification information), which is identification information of the slots 120, are exclusively assigned to the slots 120-N (N is an integer of 1 to 8).

The display 110 is, for example, a liquid crystal display device, an organic electro luminescence (EL) display device, or the like. The display 110 displays image information output by the processor 144. The image information includes, for example, the number of the slot 120 in which the rentable removable battery 510 is accommodated, a usage fee, and the like. The display 110 includes an inputter based on a touch panel sensor or the like. The touch panel sensor detects a result of an operation performed by the user and outputs the operation result, which has been detected, to the processor 144. For example, the operation result includes a replacement instruction for the removable battery 510 or the like.

The connector 120T is a connector including a structure that electrically connects to the connector 515 included in the accommodated removable battery 510 in the slot 120. The connector 120T is provided, for example, on the back side of the accommodation unit 120H, for each slot 120. Each connector 120T transmits information such as a battery ID, the number of times of charging, a deterioration state, and a measured value representing a state of the power storage 511 exchanged between the removable battery 510 accommodated in the corresponding slot 120 and the replacement device controller 140. The connector 120T transmits electric power to the removable battery 510. That is, the connector 120T supplies the power storage 511 with electric power for charging. When there are eight slots 120 as shown in FIG. 1, the slots 120-N include a connector 120T-N.

The charger 120C is a charger for charging the removable battery 510 in accordance with control from the replacement device controller 140 when the removable battery 510 is accommodated in the slot 120 and the connector 515 of the accommodated removable battery 510 is connected to the connector 120T. The charger 120C charges the removable battery 510 by supplying electric power to the power storage 511 of the removable battery 510 via the connector 120T. In the battery replacement device 100, the charger 120C is provided for each slot 120. When there are eight slots 120 as shown in FIG. 1, the connector 120T-N includes a charger 120C-N.

The replacement device storage 130 stores various information in the battery replacement device 100. The replacement device storage 130 stores a program for the replacement device controller 140 to execute the function of the battery replacement device 100. The replacement device storage 130 stores information about whether or not the removable battery 510 has been accommodated in each slot 120 and a battery ID of the removable battery 510 accommodated in each slot 120. The replacement device storage 130 stores a slot ID of each slot 120. The replacement device storage 130 stores a corresponding relationship between the slot 120 and the slot ID. The replacement device storage 130 may store information such as the number of times the removable battery 510 has been charged, a deteriorated state, a charging rate, and a measured value representing a state of the power storage 511.

The replacement device controller 140 controls the entire battery replacement device 100. The replacement device controller 140 is configured to include, for example, a processor such as a CPU. The replacement device controller 140 implements the function of the battery replacement device 100 by reading and executing the program stored in the replacement device storage 130. More specifically, the replacement device controller 140 controls the charging and rental of the removable batteries 510 respectively accommodated in the slots 120.

The measurement sensor 142 includes various sensors that measure the state when the charger 120C is charging the removable battery 510. The measurement sensor 142 is configured to include, for example, a voltage sensor, an electric current sensor, and a temperature sensor. The measurement sensor 142 measures a voltage applied to the power storage 511 when the removable battery 510 is being charged using the voltage sensor and measures an electric current flowing through the power storage 511 using the current sensor. The measurement sensor 142 measures the temperature of the power storage 511 when the removable battery 510 is being charged using the temperature sensor. The measurement sensor 142 outputs a measured value representing a measured state of the removable battery 510 to the charging controller 141.

The information acquirer 143 acquires the battery state information of the removable battery 510 accommodated in the slot 120, i.e., the removable battery 510 stored in the battery replacement device 100, via the connector 120T. The battery state information includes at least the battery ID. The battery state information may include information such as the number of times of charging and a measured value representing the state of the power storage 511. The information acquirer 143 outputs the acquired battery state information to the processor 144. The information acquirer 143 may cause the replacement device storage 130 to store the acquired battery state information.

The processor 144 carries out a procedure process of replacing the removable battery 510 in the battery replacement device 100. When the processor 144 has acquired the rental prohibition instruction via the replacement device communicator 150, the processor 144 performs control for preventing the opening/closing lid 120L (FIG. 1) from being open so that the removable battery 510 is prevented from being rented out with respect to the slot 120 corresponding to the slot ID included in the rental prohibition instruction. The rental prohibition instruction is an instruction for prohibiting rental of the removable battery 510 and includes the slot ID of the target slot 120. The processor 144 performs control so that the removable battery 510 capable of being rented out is rented out when the rental prohibition instruction has not been acquired or with respect to the slot 120 corresponding to the slot ID not included in the acquired rental prohibition instruction.

The processor 144 generates the battery state list S in which the battery ID is associated with the slot ID for each slot with respect to all the slots 120 included in the battery replacement device 100. The battery state list S may include information representing that slot 120-N is empty and information representing that slot 120-N has failed. The processor 144 outputs the generated battery state list S to the replacement device communicator 150. Thereby, the replacement device communicator 150 communicates with the operation server 200 via the network NW and transmits the battery state list S to the operation server 200. The processor 144 updates the battery state list S when the used removable battery 510u is returned and transmits the updated battery state list S to the operation server 200. Alternatively, the processor 144 may be configured to acquire the battery IDs of the removable batteries 510 of all the slots 120 at each predetermined time or a predetermined time or for each predetermined time period, update the battery state list S, and transmit the updated battery state list S to the operation server 200.

The charging controller 141 controls a state of charge of the removable battery 510. When the charging stop instruction has been acquired via the replacement device communicator 150, the charging controller 141 performs control so that charging is stopped or so that the charging is not performed with respect to the slot 120 corresponding to the slot ID included in the charging stop instruction. The charging stop instruction is an instruction for stopping charging of the removable battery 510 or an instruction for preventing charging from being performed and includes a slot ID of the target slot 120.

Also, the charging controller 141 controls charging of the removable battery 510 by controlling the charger 120C in consideration of a measured value of the removable battery 510 output from the measurement sensor 142 when the charging stop instruction has not been acquired or with respect to the slot 120 corresponding to the slot ID not included in the acquired charging stop instruction. That is, the charging controller 141 excludes the slot 120 included in the charging stop instruction and performs control so that a used removable battery 510u of a charging target is charged.

The charging controller 141 calculates the current charging rate of the removable battery 510 being charged, i.e., the current charging rate of the power storage 511 provided in the removable battery 510, based on the measured value of the removable battery 510 output from the measurement sensor 142 when the charging stop instruction has not been acquired or with respect to the slot ID not included in the acquired charging stop instruction. When the charging of the removable battery 510 has been completed, the charging controller 141 outputs information representing that the charging has been completed to the processor 144.

The replacement device communicator 150 performs wireless communication with the operation server 200 via the network NW in accordance with an instruction from the replacement device controller 140 and transmits the battery state list S to the operation server 200. The replacement device communicator 150 acquires the instruction R (the charging stop instruction or the rental prohibition instruction) from the operation server 200. The replacement device communicator 150 outputs the charging stop instruction or the rental prohibition instruction acquired from the operation server 200 to the replacement device controller 140.

(Configuration of Operation Server 200)

Figure 4:
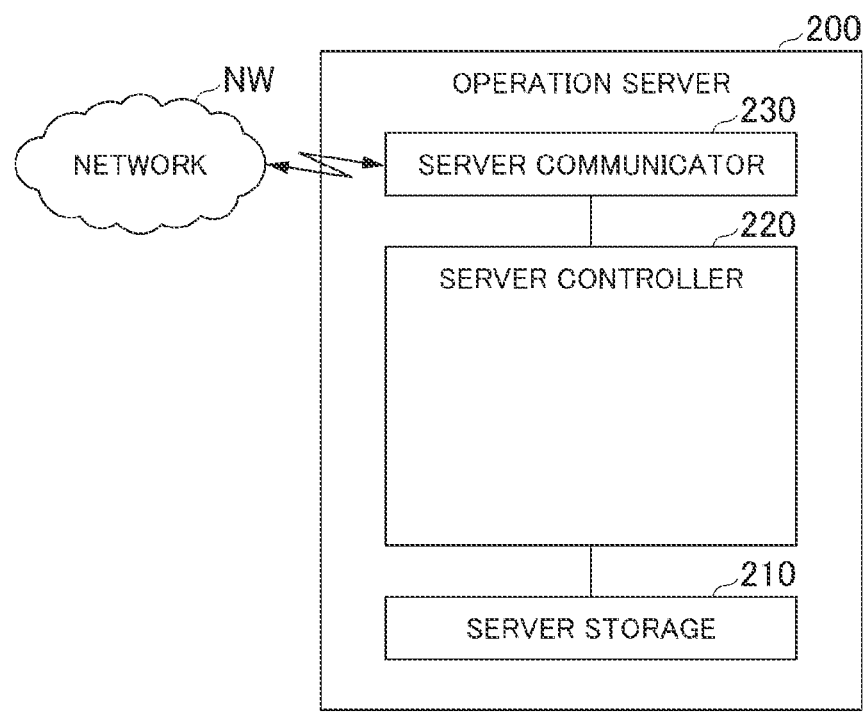
FIG. 4 is a block diagram showing a schematic configuration of an operation server constituting a shared battery management system according to the first embodiment.

Next, an example of a configuration of the operation server 200 will be described. FIG. 4 is a block diagram showing a schematic configuration of the operation server 200 constituting the shared battery management system 10 according to the first embodiment. As shown in FIG. 4, the operation server 200 includes a server storage 210, a server controller 220, and a server communicator 230. The server controller 220 is an example of a "second controller" and the server communicator 230 is an example of a "second communicator."

The server storage 210 stores various information in the operation server 200. The server storage 210 stores at least the battery state list S transmitted from the battery replacement device 100 via the network NW. The server storage 210 stores a program for the server controller 220 to execute the function of the operation server 200. The server storage 210 stores the battery ID of the removable battery 510 whose charging is desired to be avoided (whose rental is desired to be avoided) based on the information provided from the information provider. An information provider is, for example, a manufacturer of the removable battery 510, an owner who owns the removable battery 510 and rents out his or her own removable battery 510 to another person (for example, a person who has made a lease contract for the removable battery 510 with another person), a manager of the removable battery 510, or the like. The owner or the manager may be, for example, a person who indirectly provides the information provided from the manufacturer to the operation server 200 or a person who performs processing, modification, or the like on the information provided from the manufacturer and indirectly provides information on which the processing, the modification, or the like has been performed to the operation server 200. Also, the owner or the manager may be a person who provides the operation server 200 with independently generated information other than the information provided from the manufacturer. The information provided from the information provider includes, for example, a battery ID of the removable battery 510 whose charging is desired to be avoided (whose rental is desired to be avoided). The server storage 210 may store the information of the battery replacement device ID exclusively assigned to the battery replacement device 100. Hereinafter, an example in which the information provider is the manufacturer of the removable battery 510 will be described.

The server controller 220 controls the entire operation server 200. The server controller 220 is configured to include, for example, a processor such as a CPU. The server controller 220 implements the function of the operation server 200 by reading and executing the program stored in the server storage 210. More specifically, the server controller 220 generates a charging stop instruction or a rental prohibition instruction based on the battery state list S transmitted from the battery replacement device 100 and the battery ID of the removable battery 510 whose charging is desired to be avoided stored in the server storage 210. The server controller 220 outputs the generated charging stop instruction to the server communicator 230. The server controller 220 outputs the generated rental prohibition instruction to the server communicator 230.

The server communicator 230 performs wireless communication with the replacement device communicator 150 provided in the battery replacement device 100 via the network NW. The server communicator 230 receives the battery state list S transmitted from the battery replacement device 100 via the network NW and causes the server storage 210 to store the received battery state list S. The server communicator 230 transmits the charging stop instruction output by the processor 144 to the battery replacement device 100 via the network NW. The server communicator 230 transmits the rental prohibition instruction output by the processor 144 to the battery replacement device 100 via the network NW.

Here, the charging stop instruction and the rental prohibition instruction will be further described. The removable battery 510 whose charging is required to be stopped is, for example, a removable battery 510 of a lot in which a defect has occurred. It is preferable to stop charging or prevent charging from being performed with respect to the above removable battery 510. Also, it is preferable to prevent the removable battery 510 from being rented out.

However, the charged removable battery 510c whose charging has been completed before the charged removable battery 510c becomes a charging stop target may be accommodated in the slot 120. As described above, the charged removable battery 510c may be rented out when it is difficult to perform charging due to a rolling blackout or the like. In this situation, the operation server 200 may be configured to transmit the charging stop instruction for the target removable battery to the battery replacement device 100 without transmitting the rental prohibition instruction. The operation server 200 may be configured to transmit the charging stop instruction and the rental prohibition instruction and determine whether or not rental is to be performed based on the instruction R received by the battery replacement device 100.

(Battery State List)

Next, an example of the battery state list S transmitted by the battery replacement device 100 to the operation server 200 will be described. FIG. 5 is a diagram showing an example of the battery state list S transmitted by the battery replacement device 100 to the operation server 200 according to the first embodiment.

As shown in FIG. 5, the battery state list S includes information in which a battery ID is associated with a slot ID for each slot 120, and a battery replacement device ID. Although the battery state list S shown in FIG. 5 shows an example in which the removable battery 510 is accommodated in all the slots 120, information representing that a slot 120 is empty instead of the battery ID is associated with the slot ID when there is a slot 120 where the removable battery 510 is not accommodated.

The battery state list may include the number of times the removable battery 510 has been charged, information representing the deterioration state of the removable battery 510, information representing the charging rate of the removable battery 510, information representing that the slot 120 has failed, information representing that the battery replacement device 100 has failed, information representing the creation date and time (or the update date and time) of the battery state list, and the like.

Example of Processing Procedure

Figure 6:
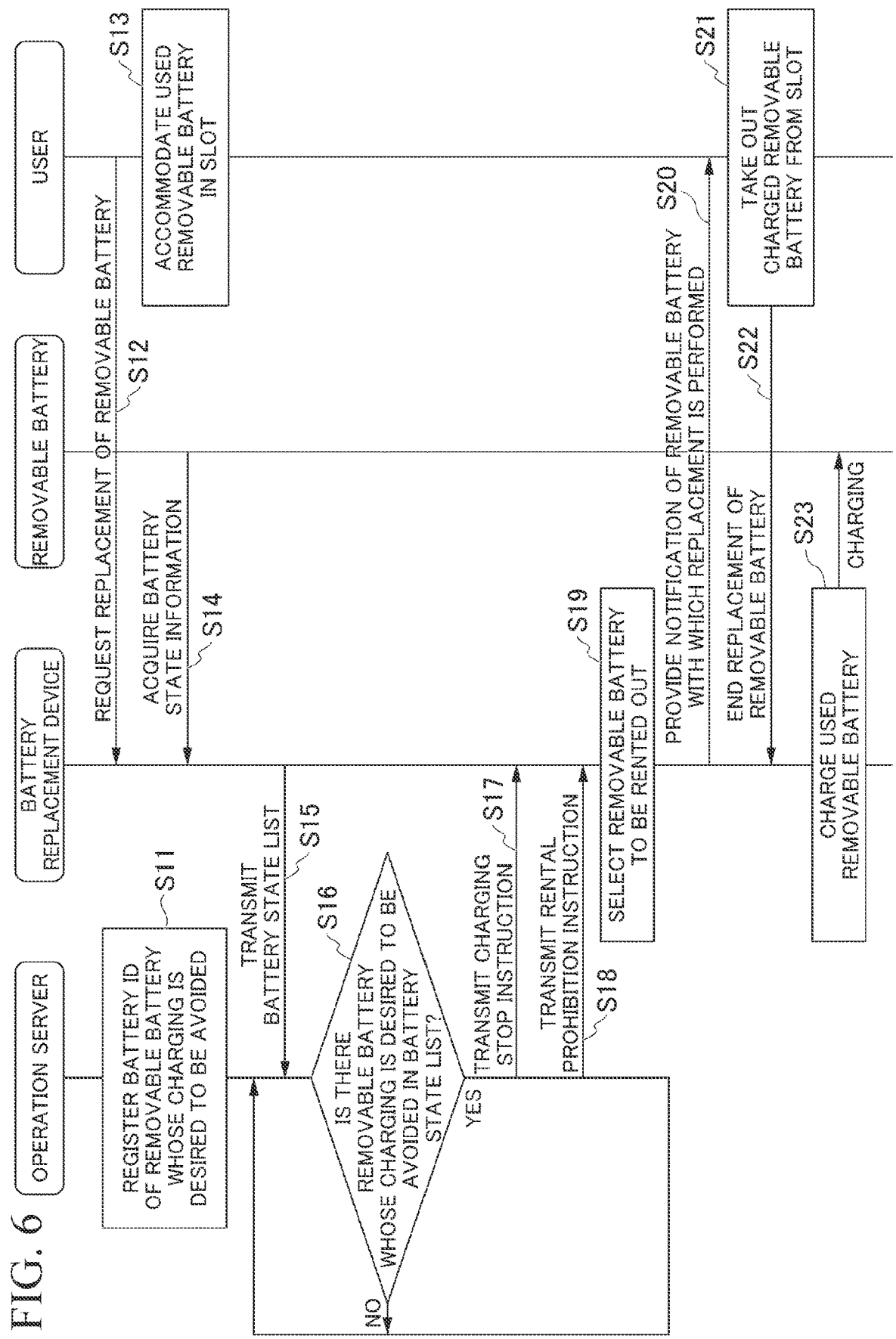
FIG. 6 is a sequence diagram of an example of a processing procedure of the shared battery management system according to the first embodiment.

Next, an example of a processing procedure of the shared battery management system 10 of the first embodiment will be described. FIG. 6 is a sequence diagram of an example of the processing procedure of the shared battery management system 10 according to the first embodiment.

(Step S11) A system operator registers the battery ID of the removable battery 510 whose charging is desired to be avoided (or whose rental is desired to be avoided) due to, for example, a defective lot product, in the operation server 200. Subsequently, the server controller 220 of the operation server 200 causes the server storage 210 to store the battery ID of the removable battery 510 whose charging is desired to be avoided (or whose rental is desired to be avoided).

(Step S12) The user goes to the charging/replacement station where the battery replacement device 100 is installed, operates the display 110 of the battery replacement device 100, and requests the replacement of the removable battery 510. Subsequently, the replacement device controller 140 of the battery replacement device 100 acquires an operation result output by the touch sensor of the display 110.

(Step S13) The replacement device controller 140 of the battery replacement device 100 controls the opening/closing lid 120L of the slot 120 where the removable battery 510 is not accommodated so that the opening/closing lid 120L is open. The user returns the used removable battery 510*u* by accommodating the used removable battery 510*u* in the slot 120 of the battery replacement device 100 in which the opening/closing lid 120L is open.

(Step S14) The replacement device controller 140 of the battery replacement device 100 acquires battery state information including the battery ID of the returned used removable battery 510*u*. Subsequently, the replacement device controller 140 updates the battery state list S based on the acquired battery state information. The replacement device controller 140 creates the battery state list S, for example, at a predetermined time, for a predetermined time period, or at a predetermined time interval.

(Step S15) The replacement device controller 140 of the battery replacement device 100 transmits the battery state list S to the operation server 200.

(Step S16) The server controller 220 of the operation server 200 determines whether or not the removable battery 510 whose charging is desired to be avoided (or whose rental is desired to be avoided) registered in step S11 is in the received battery state list S.

In other words, the server controller 220 determines whether or not there is a battery ID identical with a battery ID of the removable battery 510 whose charging is desired to be avoided (or whose rental is desired to be avoided) registered in step S11 within one or more battery IDs included in the received battery state list S.

When it is determined that the removable battery 510 whose charging is desired to be avoided (or whose rental is desired to be avoided) is in the received battery state list S (step S16; YES), the server controller 220 proceeds to the processing of step S17. When it is determined that the removable battery 510 whose charging is desired to be avoided (or whose rental is desired to be avoided) is not in the received battery state list S (step S16; NO), the server controller 220 returns to the processing of step S16.

In other words, when one or more battery IDs included in the battery state list S include the battery ID of the removable battery 510 whose charging is desired to be avoided (or whose rental is desired to be avoided), the server controller 220 proceeds to the processing of step S17. When one or more battery IDs included in the battery state list S do not include the battery ID of the removable battery 510 whose charging is desired to be avoided (or whose rental is desired to be avoided), the server controller 220 proceeds to the processing of step S16.

(Step S17) The server controller 220 of the operation server 200 transmits a charging stop instruction to the battery replacement device 100.

(Step S18) The server controller 220 of the operation server 200 transmits a rental prohibition instruction to the battery replacement device 100.

(Step S19) The replacement device controller 140 of the battery replacement device 100 selects a removable battery 510 to be rented out from among charged removable batteries 510*c* accommodated in the slots 120 other than the slot 120 included in the received rental prohibition instruction.

(Step S20) The replacement device controller 140 of the battery replacement device 100 provides a notification to the user by displaying image information representing the slot 120 where the selected removable battery 510 to be rented out is accommodated on the display 110. Subsequently, the replacement device controller 140 controls the opening/closing lid 120L of the slot 120 where the selected removable battery 510 to be rented out is accommodated so that the opening/closing lid 120L is open.

(Step S21) The user takes out the removable battery 510 accommodated in the slot 120 where the opening/closing lid 120L is opened from the slot 120.

(Step S22) The replacement device controller 140 of the battery replacement device 100 detects that the removable battery 510 for rental has been taken out from the slot 120, for example, based on a signal of the connector 120T. Subsequently, when the replacement device controller 140 detects that the removable battery 510 for rental has been taken out from the slot 120, the replacement device controller 140 controls the opening/closing lid 120L so that the opening/closing lid 120L is closed by ending a replacement process of the removable battery 510.

(Step S23) The replacement device controller 140 of the battery replacement device 100 starts charging of the returned used removable battery 510u and the removable battery 510 waiting to be charged accommodated in slots 120 other than the slot 120 included in the received charging stop instruction.

Although the example in which the battery replacement device 100 transmits the battery state list S to the operation server 200 has been described in the above-described example, the present invention is not limited thereto. The battery replacement device 100 may be configured to transmit only the battery state information of the returned removable battery 510 to the operation server 200. In this case, the operation server 200 may be configured to determine whether or not the charging is to be stopped or whether or not the rental is to be prohibited with respect to the returned used removable battery 510u.

As described above, in the first embodiment, one slot (one slot 120) is assigned to each of the removable batteries 510 within the battery replacement device 100 and the state of the removable battery 510 for each slot (the presence or absence of the removable battery 510 or the like) and information of the removable battery 510 (a unique value such as a serial number, a charging rate, or the like) are transmitted to the operation server 200. Also, in the first embodiment, the operation server 200 can set whether or not the removable battery 510 can be charged with respect to a slot (a slot 120) of one unit.

Thereby, according to the first embodiment, the information (the unique value such as the serial number) of the removable battery 510 within the battery replacement device 100 can be ascertained on the operation server 200 side of the network destination. Thereby, the operation server 200 can mechanically determine whether or not the product is a defective lot product and perform control so that charging is not performed by transmitting a charging stop instruction with respect to a slot where charging is desired to be stopped.

Also, according to the first embodiment, it is possible to control whether or not charging is available or whether or not rental is available with respect to a returned removable battery because the battery state list is updated and transmitted when the removable battery 510 has been returned.

The operation server 200 may determine whether or not the number of slots for which charging is desired to be avoided (rental is desired to be avoided) hinders the continuation of business of the charging/replacement station where the battery replacement device 100 is installed. For example, when one battery replacement device 100 is installed in the charging/replacement station, the battery replacement device 100 includes eight slots 120, and removable batteries 510 accommodated in four slots 120 are a charging stop target, it may be determined that the continuation of business is hindered. For example, when one battery replacement device 100 is installed in the charging/replacement station, the battery replacement device 100 includes eight slots 120, and removable batteries 510 accommodated in two slots 120 are the charging stop target, it may be determined that the continuation of business is not hindered.

Modified Example of First Embodiment

In the above-described first embodiment, an example in which the operation server 200 generates a charging stop instruction or a rental prohibition instruction based on the battery state list S received from the battery replacement device 100 and the information stored in the operation server 200 has been described.

However, when the battery replacement device 100 has been installed in an area where the communication environment is vulnerable, a state in which communication with the operation server 200 may not be possible may occur. Even if the battery is originally a battery whose charging is desired to be avoided (whose rental is desired to be stopped), it is feared that the battery will be rented out without being excluded from rental when the information is not updated due to a communication failure. Thus, an example in which the battery replacement device 100 performs the rental selection even if the communication is unstable as described above will be described in the modified example.

Figure 7:
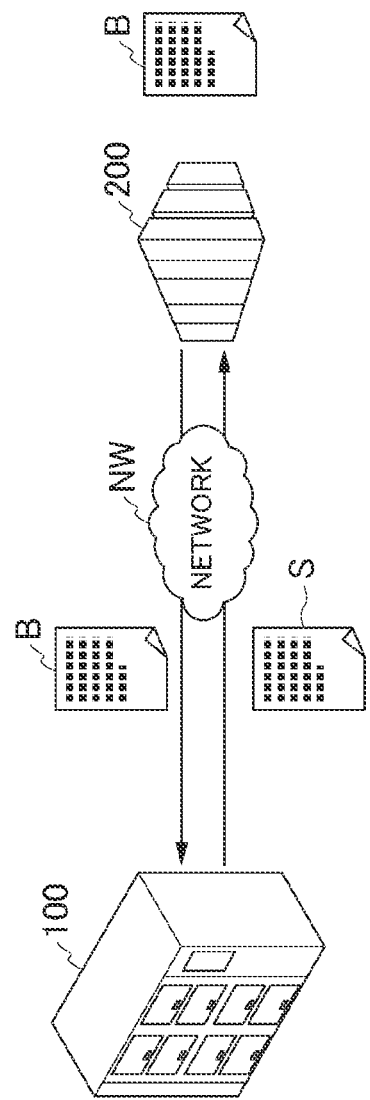
FIG. 7 is a diagram showing a concept of a battery sharing service adopting a shared battery management system according to a modified example of the first embodiment.

FIGS. 7 and 8 are diagrams showing a concept of the battery sharing service adopting the shared battery management system according to a modified example of the first embodiment. In FIG. 7, a state in which the battery state list S and the rentable battery list B are exchanged between the battery replacement device 100 and the operation server 200 via the network NW in the shared battery management system 10 is schematically shown. In FIG. 8, a state in which the battery replacement device 100 replaces the used removable battery 510u with the charged removable battery 510c brought in by a user P of the electric motorcycle 50 based on an acquired rentable battery list B is schematically shown.

In the modified example, the operation server 200 creates a rentable battery list B in which information of the rentable removable battery 510 and the order of rental has been recorded and transmits the created rentable battery list B to the battery replacement device 100 when communication is possible. The battery replacement device 100 stores the received rentable battery list B. The rentable battery list B includes a rechargeable removable battery 510, i.e., a removable battery 510 whose charging is desired to be avoided is excluded. The rentable battery list B includes information of whether or not rental is available for each slot.

When communication with the operation server 200 is not possible as shown in FIG. 8, the battery replacement device 100 selects the charged removable battery 510 to be rented in accordance with the stored rentable battery list B. In the modified example, the operation server 200 creates a rentable battery list B based on the received battery state list S and the information of the removable battery 510 whose charging is desired to be avoided (whose rental is desired to be avoided).

The rentable battery list B is, for example, a list in which the battery IDs of the removable batteries 510 with which rental (replacement) can be performed in the battery replacement device 100 are arranged in the order of rental (replacement) or the like. The operation server 200 generates the above-described rentable battery list B based on the battery state information (for example, the date of manufacture, the number of times of charging, the charging rate, or the like) included in the received battery state list S.

As shown in FIG. 8, even if the wireless communication with the operation server 200 via the network NW is interrupted or the wireless communication cannot be stably performed, it is not necessary to immediately stop or interrupt a procedure for replacing the used removable battery 510u with the charged removable battery 510c.

The battery replacement device 100 can continue a procedure for replacing the removable batteries 510 independently for the number of removable batteries 510 recorded in the rentable battery list B. Thus, in the battery sharing service adopting the shared battery management system 10, when the user P desires to replace the used removable battery 510u, he or she can replace it with the charged removable battery 510c.

Generally, the user P uses the battery sharing service at a timing when it is expected that it becomes difficult for the electric motorcycle 50 to travel due to power consumption of the removable battery 510. Thus, the shared battery management system 10 is very effective in maintaining the provision of the battery sharing service in accordance with the rentable battery list B as in the modified example.

Although a case in which the operation server 200 transmits an instruction such as a charging stop instruction or a rental prohibition instruction to the battery replacement device 100 has been described in the above-described first embodiment, the present invention is not limited thereto. For example, the operation server 200 may transmit a result of determining whether to permit or prohibit charging of the removable battery 510 or a result of determining whether to permit or prohibit rental of the removable battery 510 (detachment of the removable battery 510) to the battery replacement device 100 in place of or in addition to the charging stop instruction or the rental prohibition instruction.

Although a case in which the operation server 200 determines whether or not to stop charging of the removable battery 510 or whether or not to prohibit rental of the removable battery 510 and the instruction (the charging stop instruction or the rental prohibition instruction) based on a determination result is transmitted to the battery replacement device 100 has been described in the above-described first embodiment, the present invention is not limited thereto. For example, the battery replacement device 100 may be configured to determine whether or not to stop charging of the removable battery 510 or whether or not to prohibit rental of the removable battery 510 and control the charging of the removable battery 510 or the rental of the removable battery 510 in accordance with a determination result.

Second Embodiment

Hereinafter, a second embodiment will be described. In the first embodiment described above, a case in which charging of the removable battery 510 is stopped or rental of the removable battery 510 (detachment of the removable battery 510 from the slot) is prohibited with respect to the removable battery 510 having the same slot ID as the removable battery 510 for which the avoidance of charging or rental is requested from a manufacturer among the removable batteries 510 respectively accommodated in the plurality of slots has been described.

On the other hand, the second embodiment is different from the first embodiment in that charging of removable batteries 510 respectively accommodated in a plurality of slots is controlled based on a constraint condition regarding the electric power capable of being supplied to a battery replacement device 100. Hereinafter, the differences from the first embodiment will be mainly described and features in common with the first embodiment will be omitted. In the description of the second embodiment, the same parts as those of the first embodiment will be described with the same reference signs.

An operation server 200 according to the second embodiment generates a charging stop instruction based on information included in a battery state list S transmitted from the battery replacement device 100 and the information stored in the operation server. The operation server 200 transmits the generated charging stop instruction to the battery replacement device 100. The information stored in the operation server includes electric power capable of being received by the battery replacement device 100 (hereinafter referred to as receivable electric power) and information about the receivable electric power. The receivable electric power may be, for example, electric power (for example, the unit is [W]) or may be an amount of electric power obtained by integrating the electric power with time (for example, the unit is [Wh]). The information about the receivable electric power includes, for example, an upper limit value of the number of slots where charging can be performed simultaneously by the battery replacement device 100 (hereinafter referred to as the upper limit number of slots).

A server storage 210 according to the second embodiment stores the upper limit number of slots of the battery replacement device 100 and stores the battery state list S transmitted from the battery replacement device 100 via a network NW.

A server controller 220 according to the second embodiment generates a charging stop instruction based on the battery state list S transmitted from the battery replacement device 100 and the upper limit number of slots stored in the server storage 210.

For example, the server controller 220 generates a charging stop instruction when a sum of the number of removable batteries 510 being charged included in the battery state list S and the number of removable batteries 510 waiting to be charged are larger than the upper limit number of slots. In this case, for example, the server controller 220 may be configured to permit charging in slots up to the upper limit number of slots in descending order of charging rates. The server controller 220 outputs the generated charging stop instruction to a server communicator 230.

The server controller 220 determines the upper limit number of slots based on, for example, the power consumption of the battery replacement device 100, an electric current value required for charging the removable battery 510, and a value of an electric current capable of being supplied to the battery replacement device 100. The value of the electric current capable of being supplied to the battery replacement device 100 may be read as a value of an electric current capable of being received by the battery replacement device 100.

As in the first embodiment, the server communicator 230 according to the second embodiment performs wireless communication with the replacement device communicator 150 provided in the battery replacement device 100 via the network NW. The server communicator 230 receives the battery state list S transmitted from the battery replacement device 100 via the network NW and causes the server storage 210 to store the received battery state list S. The server communicator 230 transmits the charging stop instruction output by a processor 144 to the battery replacement device 100 via the network NW.

Here, the charging stop instruction will be further described. As for the battery replacement device 100, it is expected that devices having the same specifications will be installed in various environments. The installation environment may be a new store that involves the construction of the electrical equipment, a store that uses the existing electrical equipment, or the like. In the case of a store that uses the existing electrical equipment, it may not be necessary to construct a dedicated power supply environment with the installation of the battery replacement device 100 (for example, a store for a limited period or the like). In the battery replacement device 100 installed in such a store, the number of removable batteries 510 capable of being charged at the same time may be limited. For example, even if the battery replacement device 100 includes eight slots 120 and charging is required in all the eight slots 120 as shown in FIG. 1, there is a store in which it is not possible to secure electric power for charging in the eight slots 120 at the same time.

Thus, in the second embodiment, the operation server 200 stores the upper limit number of slots for the battery replacement device 100 of each store and determines whether or not it is necessary to stop charging based on the battery state list S and the upper limit number of slots transmitted from each store. For example, when the upper limit number of slots of the battery replacement device 100 installed in a store A is four and the number of removable batteries 510 included in the battery state list S required to be charged is six, the charging stop instruction is transmitted to the two slots 120.

FIG. 9 is a diagram showing an example of information included in the battery state list S according to the second embodiment. As shown in FIG. 9, the battery state list S includes information in which the battery state information is associated with the slot ID for each slot 120 and the battery replacement ID.

In the example shown in FIG. 9, the charging rates of the removable batteries 510 respectively accommodated in the slots 120 having slot IDs 1 to 8 are 100%, 100%, 78%, 77%, 65%, 63%, 20%, and 21%. In the example shown in FIG. 9, the removable batteries 510 having slot IDs 1 and 2 have been charged, the removable batteries 510 having slot IDs 3 to 6 are being charged, and the removable batteries 510 having slot IDs 7 and 8 are waiting to be charged.

Although an example in which the removable batteries 510 are accommodated in all the slots 120 is shown in relation to the battery state list S shown in FIG. 9, information representing that the slot 120 is empty instead of the battery ID is associated with the slot ID when there is a slot 120 where the removable battery 510 is not accommodated.

The battery state list may include the number of times the removable battery 510 has been charged, information representing a deterioration state of the removable battery 510, information representing that the slot 120 has failed, information representing the date and time when the removable battery 510 has been returned, information representing that the battery replacement device 100 has failed, information representing the creation date and time (or an update date and time) of the battery state list, and the like.

Example of Processing Procedure

Figure 10:
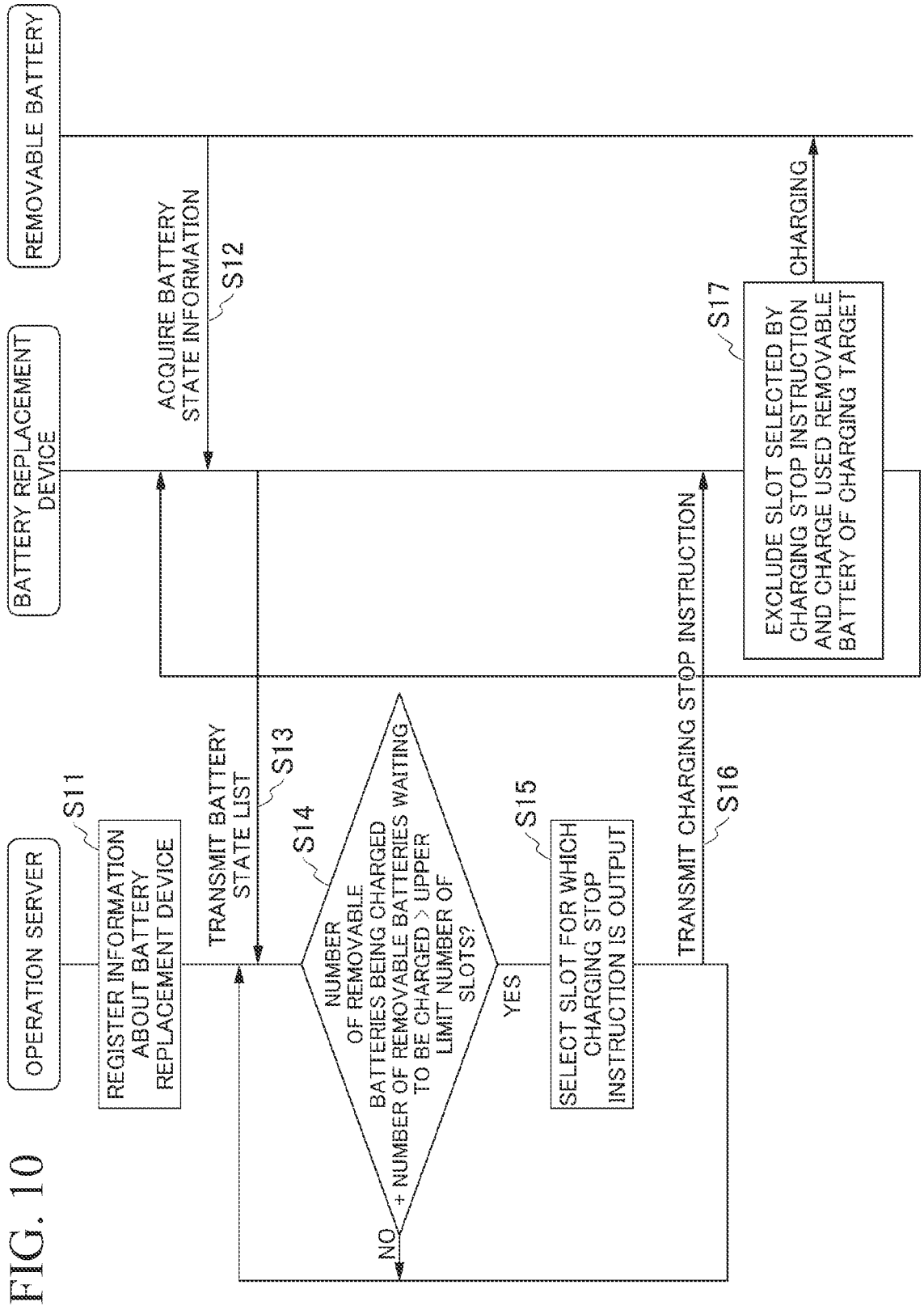
FIG. 10 is a sequence diagram of an example of a processing procedure of a shared battery management system according to the second embodiment.

Next, an example of a processing procedure in the shared battery management system 10 of the second embodiment will be described. FIG. 10 is a sequence diagram of an example of the processing procedure of the shared battery management system 10 according to the second embodiment.

(Step S11) The system operator registers information about the battery replacement device (the upper limit number of slots) for each battery replacement device 100.

(Step S12) The replacement device controller 140 of the battery replacement device 100 acquires battery state information including battery IDs of the removable batteries 510 respectively accommodated in the slots 120. Subsequently, the replacement device controller 140 updates the battery state list S based on the acquired battery state information. The replacement device controller 140 creates the battery state list S, for example, at a predetermined time, for a predetermined time period, or at a predetermined time interval.

(Step S13) The replacement device controller 140 of the battery replacement device 100 transmits the battery state list S to the operation server 200.

(Step S14) The server controller 220 of the operation server 200 determines whether or not a sum of the number of slots where the removable batteries 510 being charged included in the received battery state list S are accommodated and the number of slots where removable batteries 510 waiting to be charged are accommodated are larger than the upper limit number of slots. When it is determined that the sum of the number of slots where charging is in progress and the number of slots waiting for charging is larger than the upper limit number of slots (step S14; YES), the server controller 220 proceeds to the processing of step S15. When it is determined that the sum of the number of slots where charging is in progress and the number of slots waiting for charging is smaller than or equal to the upper limit number of slots (step S14; NO), the server controller 220 returns to the processing of step S13.

(Step S15) The server controller 220 of the operation server 200 selects a slot 120 for which a charging stop instruction is output.

(Step S16) The server controller 220 of the operation server 200 transmits the charging stop instruction to the battery replacement device 100.

(Step S17) The replacement device controller 140 of the battery replacement device 100 excludes the slot 120 selected by the charging stop instruction and charges the used removable battery 510u of the charging target. That is, the replacement device controller 140 performs control so that the removable battery 510 accommodated in the slot 120 selected by the charging stop instruction is not charged (charging is deferred).

Normally, the server controller 220 transmits a charging stop command for "(number of slots waiting to be charged)—(upper limit number of slots where simultaneous charging is possible—number of slots where charging is in progress)." However, the server controller 220 may be configured to generate the charging stop instruction so that the number of slots does not exceed an upper limit slot value by preferentially stopping charging when the removable battery 510 is charged at a level higher than or equal to a capacity serving as a rental criterion in the battery replacement device 100 or the like.

As described above, in the second embodiment, one slot (one slot 120) is assigned to each of the removable batteries 510 within the battery replacement device 100 and the state of the removable battery 510 for each slot (the presence or absence of the removable battery 510 or the like) and information of the removable battery 510 (a unique value such as a serial number, a charging rate, or the like) are transmitted to the operation server 200. Also, in the second embodiment, the operation server 200 can set whether or not the removable battery 510 can be charged for a slot (a slot 120) of one unit based on the information about the battery replacement device 100. The information about the battery replacement device 100 includes the upper limit number of slots as described above.

Thereby, according to the first modified example, it is possible to efficiently charge the removable battery 510 because charging is stopped for each slot when the electric power exceeds electric power capable of being supplied to the removable battery 510 in accordance with electric power capable of being supplied to the battery replacement device 100.

In other words, according to the second embodiment, when a maximum load of a replacement device is kept at a specific value or less because there is dependency on the installation environment of the battery replacement device 100, the operation server 200 side can preset the number of slots where simultaneous charging is possible in the battery replacement device 100 and issue the charging stop instruction to the battery replacement device 100 so that the number of slots does not exceeds the number of slots where simultaneous charging is possible. The reason why there is dependency on the installation environment of the battery replacement device 100 is that, for example, the indoor wiring of connected system power cannot withstand the maximum load of the replacement device or the like.

As a result, according to the second embodiment, it is not necessary to take an individual measure such as rewriting the program for each battery replacement device 100 because the process of the battery replacement device 100 is executed by the command from the operation server 200 side and the operation cost can be reduced because implementation is enabled using the same housing at multiple locations.

Also, according to the second embodiment, when the removable battery 510 has been returned, the battery state list is updated and transmitted, so that it is possible to control whether or not the returned removable battery can be charged.

First Modified Example of the Second Embodiment

Figure 11:
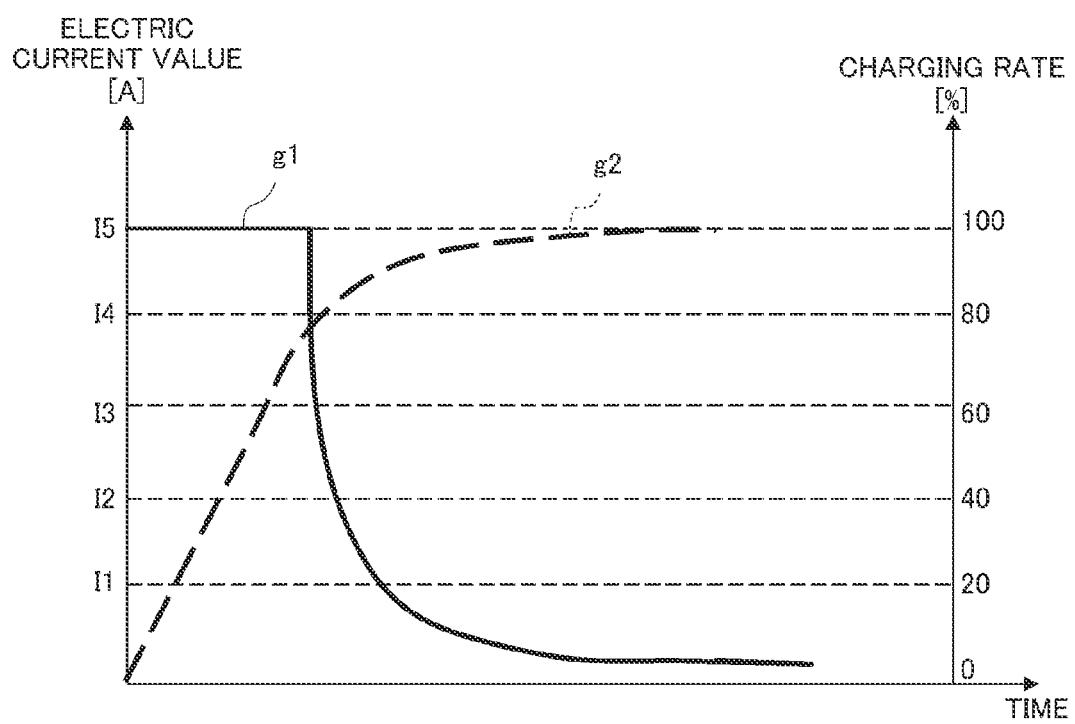
FIG. 11 is a diagram showing an example of a relationship between a charging rate and an electric current value of a battery.

Although an example in which the operation server 200 stores the upper limit number of slots in the battery replacement device 100 has been described in the above-described second embodiment, the present invention is not limited thereto. FIG. 11 is a diagram showing an example of a relationship between a charging rate and an electric current value of a battery. In FIG. 11, the horizontal axis represent time, the vertical axis on the left side represents an electric current value [A], and the vertical axis on the right side represents a charging rate [%]. Reference sign g1 represents a change in the electric current value with respect to time. Reference sign g2 represents a change in the charging rate with respect to time.

As shown in FIG. 11, an electric current value required for charging decreases as the charging rate changes. Thus, for example, when eight removable batteries having a charging rate of 10% are accommodated in the battery replacement device 100, the electric current value required for charging is I5×8 [A]. Here, the power consumption due to the control of the battery replacement device 100 and the like is omitted. When the value of the electric current capable of being supplied to the battery replacement device 100 is I5×4 [A], four removable batteries 510 with a charging rate of 10% can be charged at the same time and the remaining four removable batteries 510 are required to stop charging (wait to be charged).

On the other hand, in the example shown in FIG. 11, the electric current value required for charging the removable battery 510 having a charging rate of 80% is I4 (=(I5)×4/5). When the value of the electric current capable of being supplied to the battery replacement device 100 is I5×4 [A], five removable batteries 510 with a charging rate of 80% can be charged at the same time and the remaining three removable batteries 510 are required to stop charging (wait to be charged). As described above, the number of rechargeable removable batteries 510 varies with the charging rate of the removable battery 510.

The charging characteristics shown in FIG. 11 show the process and the charging characteristics of the removable battery 510 are not limited thereto.

The components of the battery replacement device 100, the operation server 200, and the removable battery 510 in the first modified example are the same as those in FIGS. 2 to 4. In the first modified example, the process of the operation server 200 is different.

The server storage 210 of the operation server 200 stores an upper limit electric current value (or an upper limit electric power value) for a value of an electric current (electric power) capable of being supplied to the battery replacement device 100 for each battery replacement device 100 as constraint information. The server storage 210 stores the charging characteristics (see FIG. 11) of the removable battery 510. Also, when there are a plurality of types of removable batteries 510, the server storage 210 stores the charging characteristics for each type of removable battery 510.

The server controller 220 generates the charging stop instruction based on the battery state list S transmitted from the battery replacement device 100 and the upper limit electric current value stored in the server storage 210. For example, the server controller 220 generates the charging stop instruction when a sum of a value of electric power consumed in the slot 120 (hereinafter referred to as a consumed electric power value) according to charging the removable battery 510 being charged included in the battery state list S, a consumed electric power value of the slot 120 according to charging of the removable battery 510 waiting to be charged, and an operating basic electric power value of the battery replacement device 100 is larger than the upper limit electric power value.

Alternatively, for example, the server controller 220 generates the charging stop instruction when a sum of a value of electric current consumed in the slot 120 (hereinafter referred to as a consumed electric current value) according to charging the removable battery 510 being charged included in the battery state list S, a consumed electric current value of the slot 120 according to charging of the removable battery 510 waiting to be charged, and an operating basic electric current value of the battery replacement device 100 is larger than the upper limit electric current value.

The server controller 220 calculates an electric current value for charging based on the charging rate of each removable battery 510 being charged and waiting to be charged included in the battery state list S. In this case, for example, the server controller 220 may be configured to permit charging in slots up to the upper limit number of slots in descending order of charging rates. The server controller 220 outputs the generated charging stop instruction to the server communicator 230. The battery state list S is an example of "corresponding information."

Figure 12:
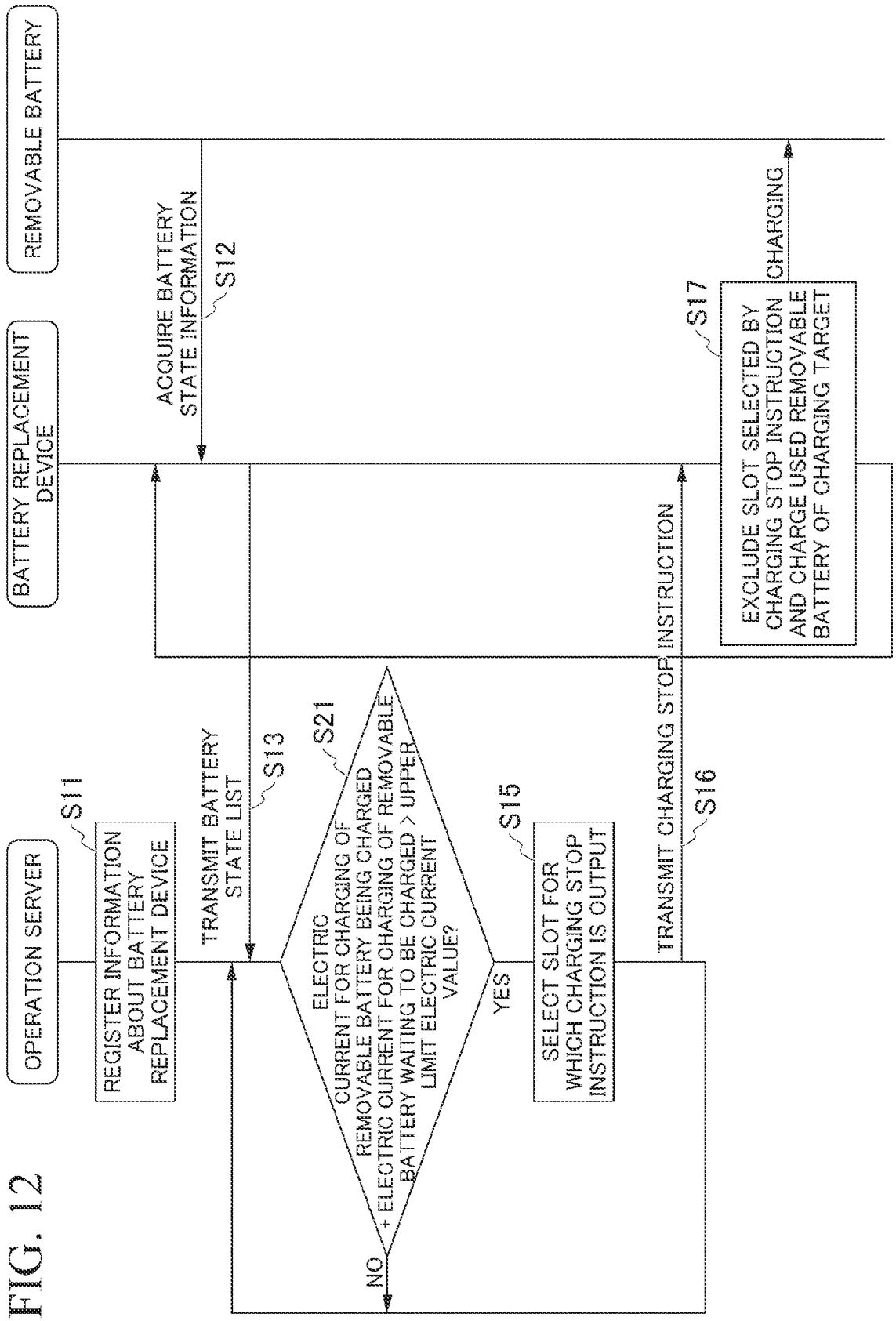
FIG. 12 is a sequence diagram of an example of a processing procedure of a shared battery management system according to a first modified example of the second embodiment.

Next, an example of a processing procedure in the shared battery management system 10 of the first modified example will be described. FIG. 12 is a sequence diagram of an example of the processing procedure of the shared battery management system 10 according to the first modified example of the second embodiment.

Processing similar to that in FIG. 10 is denoted by the same reference signs and description thereof will be omitted.

(Steps S11 to S13) The shared battery management system 10 performs the processing of steps S11 to S13. After the processing, the shared battery management system 10 proceeds to the processing of step S21.

(Step S21) The server controller 220 of the operation server 200 determines whether or not a sum of a consumed electric current value (or a consumed electric power value) of the slot 120 where the removable battery 510 being charged included in the battery state list S is accommodated, a consumed electric current value (or a consumed electric power value) of the slot 120 where the removable battery 510 waiting to be charged is accommodated, and an operating basic electric current value of the battery replacement device 100 is larger than the upper limit electric current value (or the upper limit electric power value).

When it is determined that the sum of a consumed electric current value (or a consumed electric power value) of the slot 120 where the removable battery 510 being charged is accommodated, a consumed electric current value (or a consumed electric power value) of the slot 120 where the removable battery 510 waiting to be charged is accommodated, and an operating basic electric current value of the battery replacement device 100 is larger than the upper limit electric current value (or the upper limit electric power value) (step S21; YES), the server controller 220 proceeds to the processing of step S15.

When it is determined that the sum of a consumed electric current value (or a consumed electric power value) of the slot 120 where the removable battery 510 being charged is accommodated, the consumed electric current value (or a consumed electric power value) of the slot 120 where the removable battery 510 waiting to be charged is accommodated, and an operating basic electric current value of the battery replacement device 100 is smaller than or equal to the upper limit electric current value (or the upper limit electric power value) (step S21; NO), the server controller 220 returns to the processing of step S13.

When the upper limit electric current value (or the upper limit electric power value) is used as described above, it is desirable that the battery replacement device 100 periodically (for example, every 1 or 5 minutes) transmit the battery state list to the operation server 200. The operation server 200 can accurately control the slot where charging is stopped by acquiring the charging rate of the removable battery 510 accommodated in each slot 120 based on the received battery state list.

As described above, in the first modified example, one slot (one slot 120) is assigned to each of the removable batteries 510 within the battery replacement device 100 and the state of the removable battery 510 for each slot (the presence or absence of the removable battery 510 or the like) and information of the removable battery 510 (a unique value such as a serial number, a charging rate, or the like) are transmitted to the operation server 200. In the second embodiment, the operation server 200 can set whether or not the removable battery 510 can be charged for a slot (a slot 120) of one unit based on the information about the battery replacement device 100. As described above, the information about the battery replacement device 100 is an upper limit electric current value or an upper limit electric power value and is information representing electric power capable of being supplied to the battery replacement device.

Thereby, according to the first modified example, it is possible to efficiently charge the removable battery 510 because charging is stopped for each slot when the electric power exceeds electric power capable of being supplied to the removable battery 510 in accordance with electric power capable of being supplied to the battery replacement device 100.

As a result, according to the first modified example, effects similar to those of the second embodiment can be obtained. According to the first modified example, it is not necessary to take an individual measure such as rewriting the program for each battery replacement device 100 because the process of the battery replacement device 100 is executed by the command from the operation server 200 side and the operation cost can be reduced because implementation is enabled using the same housing at multiple locations.

Even in the modified example, because the battery state list is updated and transmitted when the removable battery 510 has been returned, it is possible to control whether or not the returned removable battery can be charged.

Second Modified Example of Second Embodiment

In the first modified example of the second embodiment described above, an example in which the operation server 200 generates a charging stop instruction and a rental prohibition instruction based on the battery state list S received from the battery replacement device 100 and the information stored in the operation server 200 has been described.

However, when the battery replacement device 100 has been installed in an area where the communication environment is vulnerable, a state in which communication with the operation server 200 may not be possible may occur.

Thus, in the modified example, an example in which the battery replacement device 100 performs charging stop control even if the communication is unstable as described above will be described.

Figure 13:
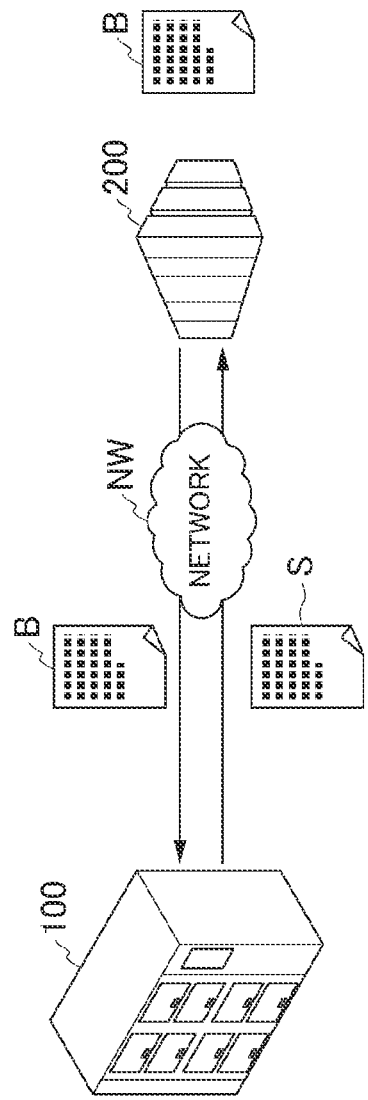
FIG. 13 is a diagram showing a concept of a battery sharing service adopting a shared battery management system according to a second modified example of the second embodiment.

FIGS. 13 and 14 are diagrams showing a concept of a battery sharing service adopting the shared battery management system according to the second modified example of the second embodiment. In FIG. 13, a state in which the battery state list S and the upper limit number of slots B are exchanged between the battery replacement device 100 and the operation server 200 via the network NW in the shared battery management system 10 is schematically shown. In FIG. 14, a state in which the battery replacement device 100 replaces the used removable battery 510u brought in by the user P of the electric motorcycle 50 with the charged removable battery 510c based on the acquired upper limit number of slots B is schematically shown.

In the second modified example, the operation server 200 creates the upper limit number of slots B, which is information representing the number of slots where charging is possible, and transmits the created upper limit number of slots B to the battery replacement device 100 when communication is possible. The operation server 200 generates the upper limit number of slots B based on, for example, the maximum charging electric current value of the charging characteristics shown in FIG. 11. The battery replacement device 100 stores the received upper limit number of slots B.

When the battery replacement device 100 cannot communicate with the operation server 200 as shown in FIG. 14, the battery replacement device 100 controls the number of slots where charging is performed in accordance with the stored upper limit number of slots B. For example, when the upper limit number of slots is four, the battery replacement device 100 may be configured to select four slots in order from the earliest date and time when the removable battery 510 was returned. When the charging of the removable battery 510 being charged has been completed, the battery replacement device 100 may be configured to start charging the removable battery 510 of the slot 120 waiting to be charged instead of the slot 120 where the charging has been completed.

As shown in FIG. 14, even if the wireless communication with the operation server 200 via the network NW is interrupted or the wireless communication cannot be stably performed, it is not necessary to immediately stop or interrupt charging of the removable battery 510. The battery replacement device 100 can continuously rent out the charged removable battery 510c and can continuously charge the battery. Thus, in the battery sharing service adopting the shared battery management system 10, when the user P desires to replace the used removable battery 510u, he or she can replace it with the charged removable battery 510c. Generally, the user P uses the battery sharing service at a timing when it is expected that it becomes difficult for the electric motorcycle 50 to travel due to power consumption of the removable battery 510. Thus, the shared battery management system 10 is very effective in maintaining the provision of the battery sharing service in accordance with the rentable battery list B as in the modified example.

Although a case in which the operation server 200 transmits instructions such as a charging stop instruction and a rental prohibition instruction to the battery replacement device 100 has been described in the above-described second embodiment, the present invention is not limited thereto. For example, the operation server 200 may transmit a slot ID of a slot 120 where a rechargeable removable battery 510 has been accommodated or the like to the battery replacement device 100 in place of or in addition to the charging stop instruction or the rental prohibition instruction.

Although a case in which the operation server 200 determines whether or not charging of the removable battery 510 is to be stopped or whether or not rental of the removable battery 510 is to be prohibited and the instruction (the charging stop instruction or the rental prohibition instruction) based on a determination result is transmitted to the battery replacement device 100 has been described in the above-described second embodiment, the present invention is not limited thereto. For example, the battery replacement device 100 may be configured to determine whether or not charging of the removable battery 510 is to be stopped or whether or not rental of the removable battery 510 is to be prohibited and control the charging of the removable battery 510 or the rental of the removable battery 510 in accordance with a determination result.

Also, all or a part of a process to be performed by the battery replacement device 100 or the operation server 200 may be performed by recording a program for implementing all or some of the functions of the battery replacement device 100 or the operation server 200 according to the present invention on a computer-readable recording medium and causing a computer system to read and execute the program recorded on the recording medium. Also, the "computer system" used here is assumed to include an operating system (OS) and hardware such as peripheral devices. Also, the "computer system" is assumed to include a homepage providing environment (or displaying environment) when a World Wide Web (WWW) system is used. The "computer-readable recording medium" refers to a storage device, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for retaining the program for a given time period as in a volatile memory (a random access memory (RAM)) inside the computer system including a server and a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium including a function of transmitting information, like a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

Expression Example 1

The above-described embodiments can be expressed as follows.

(1-1) According to an aspect of the present embodiment, there is provided a shared battery management system (10) for managing charging and rental of a removable battery (510) removably mounted on an electric vehicle (the electric motorcycle 50) and shared by a plurality of electric vehicles, the shared battery management system including: a plurality of removable batteries to which battery identification information (battery IDs) for identifying the removable batteries are assigned; a battery replacement device (100) including a plurality of slots (120) for accommodating the removable batteries, wherein slot identification information (a slot ID) for identifying the slot is assigned to each of the plurality of slots, and configured to acquire the battery identification information from the removable battery accommodated in the slot, transmit a battery state list in which the battery identification information and the slot identification information are associated for each slot to an operation server, and control whether or not charging is available for each slot based on an instruction (a charging stop instruction or a rental prohibition instruction) from the operation server; and the operation server (200) configured to determine whether or not charging is available with respect to each of the plurality of slots of the battery replacement device based on the battery state list received from the battery replacement device and information from a manufacturer of the removable battery and transmit an instruction associated with whether or not charging is available to the battery replacement device based on a determination result.

According to (1-1), the battery state list in which the identification information of the removable battery accommodated in each slot and the slot identification information are associated is transmitted to the operation server and the operation server is configured to determine whether or not the charging is available for each slot. Thereby, according to (1-1), it is possible to avoid charging of the removable battery whose charging is desired to be avoided.

(1-2) According to an aspect of the present embodiment, in the shared battery management system, the operation server may determine whether or not rental is available with respect to each of the plurality of slots of the battery replacement device based on the battery state list and information from a manufacturer of the removable battery and transmit an instruction regarding whether or not rental is available (a rental prohibition instruction) based on a determination result to the battery replacement device and the battery replacement device may control whether or not the rental of the removable battery is available for each slot based on the instruction regarding whether or not the rental is available from the operation server.

According to (1-2), the operation server is configured to determine whether or not the charging is available for each slot based on the battery state list and the information from the manufacturer of the removable battery. Thereby, according to (1-1), for example, it is possible to avoid rental of a removable battery of a defective lot.

(1-3) According to an aspect of the present embodiment, in the shared battery management system, when the removable battery has been accommodated in the slot, the battery replacement device may be configured to acquire the battery identification information to update the battery state list and transmit the updated battery state list to the operation server.

According to (1-3), because the battery state list is updated and transmitted when the removable battery has been returned, it is possible to control whether or not charging is available or whether or not rental is available with respect to the returned removable battery.

(1-4) According to an aspect of the present embodiment, in the shared battery management system, the battery state list may include at least one of the number of times the removable battery has been charged, information representing a deterioration state of the removable battery, information representing a charging rate of the removable battery, information representing that the removable battery is not accommodated in the slot, information representing that the slot has failed, and information representing that the battery replacement device has failed.

According to (1-4), in the shared battery management system, it is possible to avoid the rental of a removable battery that has deteriorated beyond a limit. According to (1-4), in the shared battery management system, a removable battery having a charging rate of a predetermined proportion or more can be included in the removable batteries for which rental (replacement) is possible. According to (1-4), in the shared battery management system, a flexible method of charging or renting out a removable battery according to the way of thinking or an intention of a manager of the shared battery management system and an operator of the battery sharing service adopting the shared battery management system can be provided.

(1-5) According to an aspect of the present embodiment, in the shared battery management system, the operation server may be configured to create a rentable battery list in which a plurality of removable batteries capable of being charged and rented out in the battery replacement device and an order of rental of the removable batteries are recorded and transmit the created rentable battery list to the battery replacement device and the battery replacement device may be configured to acquire and store the rentable battery list and perform control so that the removable battery is rented out in accordance with the order of the rental represented by the stored rentable battery list even if the instruction is not able to be acquired as a response to the transmission of the battery state list.

According to (1-5), even if a state in which communication is disabled between the battery replacement device and the operation server has occurred, the battery replacement device can rent out the removable battery based on the rentable battery list acquired from the operation server.

Expression Example 2

Also, the above-described embodiment can be expressed as follows.

(2-1) According to an aspect of the present embodiment, there is provided a shared battery management system (10) for managing charging and rental of a removable battery (510) removably mounted on an electric vehicle (the electric motorcycle 50) and shared by a plurality of electric vehicles, the shared battery management system including: a plurality of removable batteries to which battery identification information (battery IDs) for identifying the removable batteries are assigned; a battery replacement device (100) including a plurality of slots (120) for accommodating the removable batteries, wherein slot identification information for identifying the slot is assigned to each of the plurality of slots, and configured to acquire the battery identification information from the removable battery accommodated in the slot, transmit a battery state list in which the battery identification information and the slot identification information are associated for each slot to an operation server, and control whether or not charging is available for each slot based on an instruction (a charging stop instruction) from the operation server; and the operation server (200) configured to determine whether or not charging is available with respect to each of the plurality of slots of the battery replacement device based on the battery state list received from the battery replacement device and information representing electric power capable of being supplied to the battery replacement device and transmit an instruction associated with whether or not charging is available to the battery replacement device based on a determination result.

According to (2-1), the battery state list in which the identification information of the removable battery accommodated in each slot and the slot identification information are associated is transmitted to the operation server and the operation server is configured to determine whether or not the charging is available for each slot based on the received battery state list and the reception information representing the electric power capable of being supplied to the battery replacement device. Thereby, according to (2-1), it is possible to control charging of the removable battery for each slot in accordance with the electric power capable of being supplied to the battery replacement device.

(2-2) According to an aspect of the present embodiment, in the shared battery management system, the information representing the electric power capable of being supplied to the battery replacement device may be information representing the upper limit number of slots which is the number of slots where charging is performed simultaneously, when a sum of the number of slots where the removable battery being charged included in the battery state list is accommodated and the number of slots where the removable battery waiting to be charged is accommodated is larger than the upper limit number of slots, the operation server may transmit an instruction for stopping charging of the removable battery accommodated in the slot exceeding charging based on the upper limit number of slots to the battery replacement device, and the battery replacement device may perform control so that the removable battery accommodated in the slot included in the received instruction for stopping the charging is not charged.

According to (2-2), the operation server is configured to determine whether or not charging is available based on the upper limit number of slots, the number of slots where charging is in progress included in the battery state list received by the battery replacement device, and the number of slots waiting for charging. Thereby, according to (2-2), it is possible to perform control so that charging of the removable battery accommodated in the slot exceeding charging based on the number of slots according to the electric power capable of being supplied to the battery replacement device is stopped.

(2-3) According to an aspect of the present embodiment, in the shared battery management system, the information representing the electric power capable of being supplied to the battery replacement device may be information representing an upper limit electric current value which is a value of the electric power capable of being supplied to the battery replacement device, when a sum of a consumed electric current value of a slot where the removable battery being charged included in the battery state list is accommodated, a consumed electric current value of a slot where the removable battery waiting to be charged is accommodated, and an electric current value required to operate the battery replacement device is larger than the upper limit electric current value, the operation server may be configured to transmit an instruction for stopping charging of the removable battery accommodated in the slot exceeding charging based on the upper limit electric current value to the battery replacement device, and the battery replacement device may be configured to perform control so that the removable battery accommodated in the slot included in the received instruction for stopping the charging is not charged.

According to (2-3), the operation server may be configured to determine whether or not charging is available for each slot based on a consumed electric current value of a slot where charging is in progress included in the battery state list received by the battery replacement device, a consumed electric current value of a slot waiting for charging, and an electric current value required to operate the battery replacement device. Thereby, according to (2-3), it is possible to perform control so that charging of the removable battery accommodated in the slot exceeding charging based on the number of slots according to a value of an electric current capable of being supplied to the battery replacement device is stopped.

(2-4) According to an aspect of the present embodiment, in the shared battery management system, the information representing the electric power capable of being supplied to the battery replacement device may be information representing an upper limit electric power value which is a value of the electric power capable of being supplied to the battery replacement device, when a sum of a consumed electric power value of a slot where the removable battery being charged included in the battery state list is accommodated, a consumed electric power value of a slot where the removable battery waiting to be charged is accommodated, and an electric power value required to operate the battery replacement device is larger than the upper limit electric power value, the operation server may be configured to transmit an instruction for stopping charging of the removable battery accommodated in the slot exceeding charging based on the upper limit electric power value to the battery replacement device, and the battery replacement device may be configured to perform control so that the removable battery accommodated in the slot included in the received instruction for stopping the charging is not charged.

According to (2-4), the operation server may be configured to determine whether or not charging is available for each slot based on a consumed electric power value of a slot where charging is in progress included in the battery state list received by the battery replacement device, a consumed electric power value of a slot waiting for charging, and an electric power value required to operate the battery replacement device. Thereby, according to (2-4), it is possible to perform control so that charging of the removable battery accommodated in the slot exceeding charging based on the number of slots according to a value of electric power capable of being supplied to the battery replacement device is stopped.

(2-5) According to an aspect of the present embodiment, in the shared battery management system, when the removable battery has been accommodated in the slot, the battery replacement device may be configured to acquire the battery identification information to update the battery state list and transmit the updated battery state list to the operation server.

According to (2-5), because the battery state list is updated and transmitted when the removable battery has been returned, it is possible to control whether or not charging is available or whether or not rental is available with respect to the returned removable battery.

(2-6) According to an aspect of the present embodiment, in the shared battery management system, the battery state list may include at least one of the number of times the removable battery has been charged, information representing a deterioration state of the removable battery, information representing a charging rate of the removable battery, information representing that the removable battery is not accommodated in the slot, information representing that the slot has failed, and information representing that the battery replacement device has failed.

According to (2-6), in the shared battery management system, it is possible to avoid the rental of a removable battery that has deteriorated beyond a limit. According to (2-6), in the shared battery management system, a removable battery having a charging rate of a predetermined proportion or more can be included in the removable batteries for which rental (replacement) is possible. According to (2-6), in the shared battery management system, a flexible method of charging or renting out a removable battery according to the way of thinking or an intention of a manager of the shared battery management system and an operator of the battery sharing service adopting the shared battery management system can be provided.

(2-7) According to an aspect of the present embodiment, in the shared battery management system, the operation server may be configured to create a rentable battery list in which a plurality of removable batteries capable of being charged and rented out in the battery replacement device and an order of rental of the removable batteries are recorded and transmit the created rentable battery list to the battery replacement device and the battery replacement device may be configured to acquire and store the rentable battery list and perform control so that the removable battery is rented out in accordance with the order of the rental represented by the stored rentable battery list even if the instruction is not able to be acquired as a response to the transmission of the battery state list.

According to (2-7), even if a state in which communication is disabled between the battery replacement device and the operation server has occurred, the battery replacement device can rent out the removable battery based on the rentable battery list acquired from the operation server.

Although modes for carrying out the present invention have been described above using the embodiments, the present invention is not limited to the embodiments and various modifications and replacements can be applied without departing from the spirit and scope of the present invention.

REFERENCE SIGNS LIST

10 Shared battery management system (battery use system)
100 Battery replacement device (charging device)
200 Operation server
510, 510c, 510u Removable battery
120, 120-1 to 120-8 Slot (accommodation unit)
110 Display
120T Connector
120C Charger
130 Replacement device storage
140 Replacement device controller (first controller)
150 Replacement device communicator (first communicator)
141 Charging controller
142 Measurement sensor
143 Information acquirer
144 Processor
210 Server storage
220 Server controller (second controller)
230 Server communicator (second communicator)
511 Power storage
512 Measurement sensor
513 BMU
514 Storage
515 Connector
S Battery state list
R Instruction

What is claimed is:

1. A battery use system comprising:
a battery removably mounted on an electric power device using electric power;
a charging device configured to charge the battery; and
a server configured to communicate with the charging device,
wherein the charging device comprises
a first communicator configured to communicate with the server;
a plurality of accommodation units configured to accommodate the battery;
an acquirer configured to acquire identification information of the battery accommodated in an accommodation unit of the plurality of accommodation units; and
a first controller configured to transmit the identification information of the battery accommodated in the accommodation unit acquired by the acquirer to the server via the first communicator and to control detachment of the battery accommodated in the accommodation unit on the basis of reception information received by the first communicator from the server, and
wherein the server comprises
a second communicator configured to communicate with the charging device; and
a second controller configured to determine whether or not the detachment of the battery accommodated in the accommodation unit is available on the basis of a comparison of the identification information of the battery accommodated in the accommodation unit received by the second communicator and provision information provided from an information provider and to transmit transmission information based on a determination result of whether or not the detachment of the battery is available to the charging device via the second communicator, the provision information comprising a plurality of pieces of identification information of a battery that is employed to determine whether or not the detachment of the battery is available,
wherein the first controller is configured to control the detachment of the battery accommodated in the accommodation unit on the basis of the transmission information transmitted by the second controller.

2. The battery use system according to claim 1,
wherein the provision information comprises first identification information which includes a plurality of pieces of identifying information of a battery whose detachment should be prohibited, and
wherein, when second identification information, which is the identification information of the battery accommodated in the accommodation unit received by the second communicator, is identical with the first identification information, the second controller is configured to determine that the detachment of the battery accommodated in the accommodation unit corresponding to the second identification information identical with the first identification information is unavailable and to transmit the transmission information based on a determination result of determining that the detachment of the battery accommodated in the accommodation unit is unavailable to the charging device via the second communicator.

3. The battery use system according to claim 2,
wherein the first controller is configured to prohibit the detachment of the battery accommodated in the accommodation unit corresponding to the second identification information of the battery accommodated in the accommodation unit identical with the first identification information on the basis of the reception information received by the first communicator from the server.

4. The battery use system according to claim 1,
wherein the second controller is configured to determine whether or not the detachment of the battery accommodated in the accommodation unit is available on the basis of the identification information of the battery accommodated in the accommodation unit and the provision information, and to transmit the transmission information on a determination result to the charging device via the second communicator, and
wherein the first controller is configured to prohibit the detachment of the battery accommodated in the accommodation unit on the basis of the reception information received by the first communicator from the server.

5. The battery use system according to claim 1,
wherein the charging device further comprises a storage configured to store information,
wherein the second controller is configured to generate corresponding information in which an order of a plurality of batteries accommodated in the plurality of accommodation units to be preferentially detached from the plurality of accommodation units is associated with identification information of each of a plurality of batteries capable of being detached from the plurality of accommodation units on the basis of the identification information of the battery accommodated in the accommodation unit received by the second communicator and transmit the generated corresponding information to the charging device via the second communicator, and
wherein the first controller is configured to cause the storage to store the corresponding information received by the first communicator and control the detachment of the battery accommodated in each of the plurality of the accommodation units on the basis of the corresponding information stored in the storage.

6. The battery use system according to claim 1,
wherein the acquirer is configured to acquire the identification information from the battery newly accommodated in the accommodation unit when the battery has been newly accommodated in the accommodation unit where the battery was not accommodated, and
wherein the first controller is configured to transmit the identification information newly acquired by the acquirer to the server via the first communicator when the identification information has been newly acquired by the acquirer.

7. The battery use system according to claim 1,
wherein the acquirer is further configured to acquire incidental information comprising at least one of the number of times the battery has been charged, a state of deterioration of the battery, and a charging rate of the battery; and
wherein the first controller is configured to transmit the incidental information acquired by the acquirer to the server via the first communicator.

8. The battery use system according to claim 1,
wherein the charging device further comprises another acquirer configured to acquire charging device information comprising at least one of information representing that the battery is not accommodated in the accommodation unit, information representing that the accommodation unit has failed, and information representing that the charging device has failed, and
wherein the first controller is configured to transmit the charging device information acquired by the another acquirer to the server via the first communicator.

9. The battery use system according to claim 1,
wherein the charging device further comprises a display, and
wherein the first controller is configured to cause the display to display an image representing the accommodation unit where the battery, which is determined that the detachment is available, is accommodated among the plurality of accommodation units.

10. The battery use system according to claim 1,
wherein the charging device further comprises a lid configured to open and close an opening of each of the plurality of accommodation units, and
wherein the first controller is configured to prevent, from being opened, the lid of the accommodation unit where the battery, which is determined that the detachment is unavailable, is accommodated among the plurality of accommodation units.

11. The battery use system according to claim 1,
wherein the information provider is a manufacturer of the battery, an owner of the battery, or a manager of the battery.

12. The battery use system according to claim 1,
wherein the charging device further comprises a charger configured to control charging of the battery for each of the plurality of accommodation units, and
wherein the second controller is further configured to determine whether or not charging of the battery accommodated in each of the plurality of accommodation units is available on the basis of the identification information of the battery accommodated in the accommodation unit and the provision information.

13. The battery use system according to claim 12,
wherein the first controller is configured to prohibit the detachment of the battery, which is determined that the detachment is unavailable, on the basis of the determination result of determining whether or not the detachment of the battery is available, regardless of a determination result of determining whether or not the charging of the battery is available.

14. An information processing device comprising:
a communicator configured to receive identification information of a battery accommodated in an accommodation unit from a charging device comprising a plurality of accommodation units, which is configured to accommodate the battery removably mounted on an electric power device using electric power, and configured to charge the battery accommodated in the accommodation unit; and
a controller configured to determine whether or not detachment of the battery accommodated in the accommodation unit is available on the basis of a comparison of the identification information of the battery accommodated in the accommodation unit received by the communicator and provision information provided from an information provider and to transmit transmission information for causing the charging device to control the detachment of the battery accommodated in the accommodation unit on the basis of a determination result to the charging device via the communicator, the provision information comprising a plurality of pieces of identification information of a battery that is employed to determine whether or not the detachment of the battery is available, wherein the charging device comprises another controller configured to control the detachment of the battery accommodated in the accommodation unit on the basis of the transmission information transmitted by the controller.

15. A battery use method comprising:
a process in which a computer, which comprises a communicator configured to receive identification information of a battery accommodated in an accommodation unit from a charging device comprising a plurality of accommodation units, which is configured to accommodate the battery removably mounted on an electric power device using electric power, and configured to charge the battery accommodated in the accommodation unit, is configured to determine whether or not detachment of the battery accommodated in the accommodation unit is available;
a process in which the computer determines whether or not the detachment is available on the basis of a comparison of the identification information of the battery accommodated in the accommodation unit received by the communicator and provision information provided from an information provider, the provision information comprising a plurality of pieces of identification information of a battery that is employed to determine whether or not the detachment of the battery is available;
a process in which the computer is configured to transmit transmission information for causing the charging device to control the detachment of the battery accommodated in the accommodation unit on the basis of a determination result to the charging device via the communicator; and
a process in which the computer is configured to cause the charging device control detachment of the battery accommodated in the accommodation unit on the basis of the transmission information transmitted by the computer.

16. A computer-readable non-transitory storage medium storing a program for causing a computer to execute:
a process in which a computer, which comprises a communicator configured to receive identification information of a battery accommodated in an accommodation unit from a charging device comprising a plurality of accommodation units, which is configured to accommodate the battery removably mounted on an electric power device using electric power, and configured to charge the battery accommodated in the accommodation unit, is configured to determine whether or not detachment of the battery accommodated in the accommodation unit is available;
a process in which the computer determines whether or not the detachment is available on the basis of a comparison of the identification information of the battery accommodated in the accommodation unit received by the communicator and provision information provided from an information provider, the provision information comprising a plurality of pieces of identification information of a battery that is employed to determine whether or not the detachment of the battery is available;
a process in which the computer is configured to transmit transmission information for causing the charging device to control the detachment of the battery accommodated in the accommodation unit on the basis of a determination result to the charging device via the communicator; and
a process in which the computer is configured to cause the charging device control detachment of the battery accommodated in the accommodation unit on the basis of the transmission information transmitted by the computer.

17. A charging device configured to charge a battery removably mounted on an electric power device using electric power, the charging device comprising:
a plurality of accommodation units configured to accommodate the battery;
an acquirer configured to acquire identification information of the battery accommodated in an accommodation unit of the plurality of accommodation units;
a receiver configured to receive provision information provided from an information provider, the provision information comprising a plurality of pieces of an identification information of a battery that is employed to determine whether or not a detachment of the battery is available; and
a controller configured to determine whether or not the detachment of the battery accommodated in the accommodation unit is available on the basis of a comparison of the identification information of the battery accommodated in the accommodation unit acquired by the acquirer and the provision information received by the receiver, and to control the detachment of the battery accommodated in the accommodation unit on the basis of a determination result of whether or not the detachment of the battery is available.

18. The charging device according to claim 17,
wherein the provision information comprises first identification information which includes a plurality of pieces of identifying identification information of a battery whose detachment should be prohibited, and
wherein, when second identification information, which is the identification information of the battery acquired by the acquirer, is identical with the first identification information, the controller is configured to determine that the detachment of the battery accommodated in the accommodation unit corresponding to the second identification information of the battery accommodated in the accommodation unit identical with the first identification information is unavailable.

19. The charging device according to claim 18,
wherein the controller is configured to prohibit the detachment of the battery accommodated in the accommodation unit corresponding to the second identification information of the battery accommodated in the accommodation unit identical with the first identification information.

20. The charging device according to claim 17,
wherein the controller is configured to determine whether or not the detachment of the battery accommodated in the accommodation unit is available on the basis of the identification information of the battery accommodated in the accommodation unit acquired by the acquirer and the provision information received by the receiver, and to prohibit the detachment of the battery accommodated in the accommodation unit on the basis of a determination result of whether or not the detachment of the battery is available.

21. The charging device according to claim 17, further comprising a storage configured to store information, wherein the storage stores corresponding information in which an order of a plurality of batteries accommodated in the plurality of accommodation units to be preferentially detached from the plurality of accommodation units is associated with identification information of each of a plurality of batteries capable of being detached from the plurality of accommodation units on the basis of the identification information of the battery accommodated in the accommodation unit acquired by the acquirer, and wherein the controller is configured to control the detachment of the battery accommodated in each of the plurality of the accommodation units on the basis of the corresponding information stored in the storage.

22. The charging device according to claim 17, wherein the acquirer is configured to acquire the identification information from the battery newly accommodated in the accommodation unit when the battery has been newly accommodated in the accommodation unit where the battery was not accommodated.

23. The charging device according to claim 17, wherein the acquirer is further configured to acquire incidental information comprising at least one of the number of times the battery has been charged, a state of deterioration of the battery, and a charging rate of the battery.

24. The charging device according to claim 17, further comprising another acquirer configured to acquire charging device information comprising at least one of information representing that the battery is not accommodated in the accommodation unit, information representing that the accommodation unit has failed, and information representing that the charging device has failed.

25. The charging device according to claim 17, further comprising a display,
wherein the controller is configured to cause the display to display an image representing the accommodation unit where the battery, which is determined that the detachment is available, is accommodated among the plurality of accommodation units.

26. The charging device according to claim 17, further comprising a lid configured to open and close an opening of the plurality of accommodation units, and
wherein the controller is configured to prevent, from being opened, the lid of the accommodation unit where the battery, which is determined that the detachment is unavailable, is accommodated among the plurality of accommodation units.

27. The charging device according to claim 17, wherein the information provider is a manufacturer of the battery, an owner of the battery, or a manager of the battery.

28. The charging device according to claim 17, further comprising a charger configured to control charging of the battery for each of the plurality of accommodation units, and
wherein the controller is further configured to determine whether or not charging of the battery accommodated in the accommodation unit is available on the basis of the identification information of the battery accommodated in the accommodation unit acquired by the acquirer and the provision information received by the receiver, and to control the charger to charge the battery accommodated in the accommodation unit on the basis of a determination result of whether or not the charging of the battery is available.

29. The charging device according to claim 28,
wherein the controller is configured to prohibit the detachment of the battery accommodated in the accommodation unit, which is determined that the detachment is unavailable, on the basis of the determination result of determining whether or not the detachment of the battery is available, regardless of the determination result of determining whether or not the charging of the battery is available.

30. The charging device according to claim 17,
wherein the receiver is configured to communicate with a server and receive the provision information from the server.

31. A control method of a charging device comprising a plurality of accommodation units, which is configured to accommodate a battery removably mounted on an electric power device using electric power and charge the battery accommodated in an accommodation unit of the plurality of accommodation units, the control method comprising:
a process for acquiring identification information of the battery accommodated in the accommodation unit;
a process for acquiring provision information provided from an information provider, the provision information comprising a plurality of pieces of identification information of a battery that is employed to determine whether or not detachment of the battery is available;
a process for determining whether or not the detachment of the battery accommodated in the accommodation unit is available on the basis of a comparison of the identification information of the battery accommodated in the accommodation unit and the provision information; and
a process for controlling the detachment of the battery accommodated in the accommodation unit on the basis of a determination result of whether or not the detachment of the battery is available.

32. A computer-readable non-transitory storage medium storing a program for causing a computer of a charging device comprising a plurality of accommodation units, which is configured to accommodate a battery removably mounted on an electric power device using electric power and charge the battery accommodated in an accommodation unit of the plurality of accommodation units, to execute:
a process for acquiring identification information of the battery accommodated in the accommodation unit;
a process for acquiring provision information provided from an information provider, the provision information comprising a plurality of pieces of identification information of a battery that is employed to determine whether or not detachment of the battery is available;
a process for determining whether or not the detachment of the battery accommodated in the accommodation unit is available on the basis of a comparison of the identification information of the battery accommodated in the accommodation unit and the provision information; and
a process for controlling the detachment of the battery the accommodation unit on the basis of a determination result of whether or not the detachment of the battery is available.

* * * * *